(12) United States Patent
Audfray et al.

(10) Patent No.: US 12,738,289 B2
(45) Date of Patent: Sep. 15, 2026

(54) VOICE PROCESSING FOR MIXED REALITY

(71) Applicant: Magic Leap, Inc., Plantation, FL (US)

(72) Inventors: Remi Samuel Audfray, San Francisco, CA (US); Mark Brandon Hertensteiner, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 150 days.

(21) Appl. No.: 18/700,175

(22) PCT Filed: Oct. 13, 2022

(86) PCT No.: PCT/US2022/078063
§ 371 (c)(1),
(2) Date: Apr. 10, 2024

(87) PCT Pub. No.: WO2023/064870
PCT Pub. Date: Apr. 20, 2023

(65) Prior Publication Data

US 2024/0420718 A1 Dec. 19, 2024

Related U.S. Application Data

(60) Provisional application No. 63/256,460, filed on Oct. 15, 2021.

(51) Int. Cl.
*G06F 3/16* (2006.01)
*G10L 21/003* (2013.01)

(52) U.S. Cl.
CPC .............. *G10L 21/003* (2013.01); *G06F 3/16* (2013.01)

(58) Field of Classification Search
CPC ..................................................... G10L 21/003
See application file for complete search history.

(56) References Cited

U.S. PATENT DOCUMENTS 4,158,750 A 6/1979 Sakoe
4,852,988 A 8/1989 Velez
(Continued)

FOREIGN PATENT DOCUMENTS

CA 2316473 A1 1/2001
CA 2362895 A1 12/2002
(Continued)

OTHER PUBLICATIONS

Backstrom, T. (Oct. 2015). "Voice Activity Detection Speech Processing," Aalto University, vol. 58, No. 10; Publication [online], retrieved Apr. 19, 2020, retrieved from the Internet: URL: https://mycourses.aalto.fi/pluginfile.php/146209/mod_resource/content/1/slides_07_vad.pdf, ; pp. 1-36.
(Continued)

*Primary Examiner* — Mahelet Shiberou
(74) *Attorney, Agent, or Firm* — Tobias Intellectual Propety Law, PLLC

(57) ABSTRACT

This disclosure is related to systems and methods for rendering audio for a mixed reality environment. Methods according to embodiments of this disclosure include receiving an input audio signal, via a wearable device in communication with a mixed reality environment, the input audio signal corresponding to a sound source originating from a real environment. In some embodiments, the system can determine one or more acoustic properties associated with the mixed reality environment. In some embodiments, the system can determine a signal modification parameter based on the one or more acoustic properties associated with the mixed reality environment. In some embodiments, the system can apply the signal modification parameter to the input audio signal to determine a second audio signal. The system can present the second audio signal to the user.

18 Claims, 22 Drawing Sheets

700

Receive an input audio signal corresponding to a real sound source originating from a real environment — 702

Determine a sound source directivity pattern associated with the input audio signal — 704

Determine one or more acoustic properties associated with the virtual environment — 706

Determine a signal modification parameter based on the sound source directivity pattern and the one or more acoustic properties — 708

Apply the signal modification parameter to obtain a second audio sigal — 710

Present the second audio signal to the user — 712

(56) References Cited

U.S. PATENT DOCUMENTS 5,627,899 A 5/1997 Craven et al.
6,433,760 B1 8/2002 Vaissie
6,491,391 B1 12/2002 Blum et al.
6,496,799 B1 12/2002 Pickering
6,738,482 B1 5/2004 Jaber
6,820,056 B1 11/2004 Harif
6,847,336 B1 1/2005 Lemelson
6,943,754 B2 9/2005 Aughey
6,977,776 B2 12/2005 Volkenandt et al.
7,346,654 B1 3/2008 Weiss
7,347,551 B2 3/2008 Fergason et al.
7,488,294 B2 2/2009 Torch
7,587,319 B2 9/2009 Catchpole
7,979,277 B2 7/2011 Larri et al.
8,154,588 B2 4/2012 Burns
8,235,529 B1 8/2012 Raffle
8,611,015 B2 12/2013 Wheeler
8,638,498 B2 1/2014 Bohn et al.
8,696,113 B2 4/2014 Lewis
8,929,589 B2 1/2015 Publicover et al.
9,010,929 B2 4/2015 Lewis
9,264,834 B2 * 2/2016 Soulodre .................. G01H 7/00
9,274,338 B2 3/2016 Robbins et al.
9,292,973 B2 3/2016 Bar-zeev et al.
9,294,860 B1 3/2016 Carlson
9,323,325 B2 4/2016 Perez et al.
9,715,875 B2 7/2017 Piernot
9,720,505 B2 8/2017 Gribetz et al.
10,013,053 B2 7/2018 Cederlund et al.
10,025,379 B2 7/2018 Drake et al.
10,062,377 B2 8/2018 Larri et al.
10,134,425 B1 11/2018 Johnson, Jr.
10,289,205 B1 5/2019 Sumter
10,839,789 B2 11/2020 Larri et al.
10,971,140 B2 4/2021 Catchpole
11,151,997 B2 10/2021 Sugiyama et al.
11,328,740 B2 5/2022 Lee et al.
11,587,563 B2 2/2023 Sheeder et al.
11,790,935 B2 10/2023 Lee et al.
11,854,550 B2 12/2023 Sheeder
11,854,566 B2 12/2023 Leider
11,917,384 B2 2/2024 Roach
12,094,489 B2 9/2024 Lee
12,238,496 B2 2/2025 Roach et al.
12,243,531 B2 3/2025 Sheeder et al.
2001/0055985 A1 12/2001 Matt et al.
2003/0030597 A1 2/2003 Geist
2005/0033571 A1 2/2005 Huang
2005/0069852 A1 3/2005 Janakiraman et al.
2006/0023158 A1 2/2006 Howell et al.
2006/0072767 A1 4/2006 Zhang et al.
2006/0098827 A1 5/2006 Paddock et al.
2006/0178876 A1 8/2006 Sato et al.
2007/0225982 A1 9/2007 Washio
2008/0124690 A1 5/2008 Redlich
2008/0201138 A1 8/2008 Visser et al.
2009/0180626 A1 7/2009 Nakano
2010/0245585 A1 9/2010 Fisher et al.
2010/0323652 A1 12/2010 Visser et al.
2011/0211056 A1 9/2011 Publicover et al.
2011/0213664 A1 9/2011 Osterhout
2011/0238407 A1 9/2011 Kent
2011/0288860 A1 11/2011 Schevciw et al.
2012/0021806 A1 1/2012 Maltz
2012/0130713 A1 5/2012 Shin et al.
2012/0209601 A1 8/2012 Jing
2013/0077147 A1 3/2013 Efimov
2013/0204607 A1 8/2013 Baker, IV
2013/0226589 A1 8/2013 Largey
2013/0236040 A1 9/2013 Crawford
2013/0339028 A1 12/2013 Rosner et al.
2014/0016793 A1 1/2014 Gardner
2014/0194702 A1 7/2014 Tran
2014/0195918 A1 7/2014 Friedlander
2014/0200887 A1 7/2014 Nakadai et al.
2014/0222430 A1 8/2014 Rao
2014/0270202 A1 9/2014 Ivanov et al.
2014/0270244 A1 9/2014 Fan
2014/0310595 A1 10/2014 Acharya et al.
2014/0337023 A1 11/2014 Mcculloch et al.
2014/0379336 A1 12/2014 Bhatnagar
2015/0006181 A1 1/2015 Fan et al.
2015/0168731 A1 6/2015 Robbins
2015/0310857 A1 10/2015 Habets et al.
2015/0348572 A1 12/2015 Thornburg et al.
2016/0019910 A1 1/2016 Faubel et al.
2016/0066113 A1 3/2016 Elkhatib et al.
2016/0112817 A1 4/2016 Fan et al.
2016/0142830 A1 5/2016 Hu
2016/0165340 A1 6/2016 Benattar
2016/0180837 A1 6/2016 Gustavsson
2016/0216130 A1 7/2016 Abramson et al.
2016/0217781 A1 7/2016 Zhong et al.
2016/0284350 A1 9/2016 Yun et al.
2016/0358598 A1 12/2016 Williams et al.
2016/0379629 A1 12/2016 Hofer et al.
2016/0379632 A1 12/2016 Hoffmeister et al.
2016/0379638 A1 12/2016 Basye et al.
2017/0078819 A1 3/2017 Habets
2017/0091169 A1 3/2017 Bellegarda
2017/0092276 A1 3/2017 Sun et al.
2017/0110116 A1 4/2017 Tadpatrikar et al.
2017/0148429 A1 5/2017 Hayakawa
2017/0270919 A1 9/2017 Parthasarathi et al.
2017/0280239 A1 9/2017 Sekiya
2017/0316780 A1 11/2017 Lovitt
2017/0330555 A1 11/2017 Kawano
2017/0332187 A1 11/2017 Lin
2018/0011534 A1 1/2018 Poulos et al.
2018/0053284 A1 2/2018 Rodriguez et al.
2018/0077095 A1 3/2018 Deyle et al.
2018/0129469 A1 5/2018 Vennström et al.
2018/0227665 A1 8/2018 Elko et al.
2018/0316939 A1 11/2018 Todd
2018/0336902 A1 11/2018 Cartwright et al.
2018/0349946 A1 12/2018 Nguyen
2018/0358021 A1 12/2018 Mistica et al.
2018/0366114 A1 12/2018 Anbazhagan et al.
2019/0129944 A1 5/2019 Kawano
2019/0362704 A1 11/2019 Nicolis et al.
2019/0362741 A1 11/2019 Li et al.
2019/0373362 A1 12/2019 Ansai et al.
2019/0392641 A1 12/2019 Taylor
2020/0027455 A1 1/2020 Sugiyama et al.
2020/0064921 A1 2/2020 Kang et al.
2020/0194028 A1 6/2020 Lipman
2020/0213729 A1 7/2020 Soto
2020/0279552 A1 9/2020 Piersol et al.
2020/0286465 A1 9/2020 Wang et al.
2020/0296521 A1 9/2020 Wexler et al.
2020/0335128 A1 10/2020 Sheeder et al.
2020/0382895 A1 * 12/2020 Schissler ................. H04S 7/305
2021/0056966 A1 2/2021 Bilac et al.
2021/0125609 A1 4/2021 Dusan et al.
2021/0192413 A1 6/2021 Shirazipour
2023/0386461 A1 11/2023 Leider
2023/0410835 A1 12/2023 Lee
2024/0087565 A1 3/2024 Sheeder
2024/0087587 A1 3/2024 Leider
2024/0163612 A1 5/2024 Roach
2025/0006219 A1 1/2025 Lee
2025/0254488 A1 * 8/2025 Eronen .................. G10K 15/08

FOREIGN PATENT DOCUMENTS

CA 2388766 A1 12/2003
CN 105529033 A 4/2016
EP 2950307 A1 12/2015
EP 3211918 A1 8/2017
JP S52144205 A 12/1977
JP 06075588 A 3/1994
JP 2000148184 A 5/2000
JP 2000261534 A 9/2000
JP 2002135173 A 5/2002

(56) References Cited

FOREIGN PATENT DOCUMENTS

| | | | |
|---|---|---|---|
| JP | 2003264883 | A | 9/2003 |
| JP | 2005196134 | A | 7/2005 |
| JP | 2008242067 | A | 10/2008 |
| JP | 2010273305 | A | 12/2010 |
| JP | 2013183358 | A | 9/2013 |
| JP | 2014137405 | A | 7/2014 |
| JP | 2014178339 | A | 9/2014 |
| JP | 2016004270 | A | 1/2016 |
| JP | 2017211596 | A | 11/2017 |
| JP | 2018523156 | A | 8/2018 |
| JP | 2018179954 | A | 11/2018 |
| WO | 2014113891 | A1 | 7/2014 |
| WO | 2014159581 | A1 | 10/2014 |
| WO | 2015169618 | A1 | 11/2015 |
| WO | 2016063587 | A1 | 4/2016 |
| WO | 2016151956 | A1 | 9/2016 |
| WO | 2016153712 | A1 | 9/2016 |
| WO | 2017003903 | A1 | 1/2017 |
| WO | 2017017591 | A1 | 2/2017 |
| WO | 2017191711 | A1 | 11/2017 |
| WO | 2018163648 | A1 | 9/2018 |
| WO | 2019224292 | A1 | 11/2019 |
| WO | 2020180719 | A1 | 9/2020 |
| WO | 2020214844 | A1 | 10/2020 |
| WO | 2022072752 | A1 | 4/2022 |
| WO | 2023064875 | A1 | 4/2023 |

OTHER PUBLICATIONS

Bilac, M. et al. (Nov. 15, 2017). Gaze and Filled Pause Detection for Smooth Human-Robot Conversations. www.angelicalim.com , retrieved on Jun. 17, 2020, Retrieved from the internet URL: http://www.angelicalim.com/papers/humanoids2017_paper.pdf entire document, 8 pages. (20.40).

Chinese Office Action dated Dec. 21, 2023, for CN Application No. 201980050714.4, with English translation, eighteen pages.

European Office Action dated Dec. 12, 2023, for EP Application No. 20766540.7, four pages.

European Office Action dated Jun. 1, 2023, for EP Application No. 19822754.8, six pages.

European Search Report dated Nov. 12, 2021, for EP Application No. 19822754.8, ten pages.

European Search Report dated Nov. 21, 2022, for EP Application No. 20791183.5 nine pages.

European Search Report dated Oct. 6, 2022, for EP Application No. 20766540.7 nine pages.

Final Office Action mailed Apr. 10, 2023, for U.S. Appl. No. 16/850,965, filed Apr. 16, 2020, sixteen pages.

Final Office Action mailed Apr. 15, 2022, for U.S. Appl. No. 16/850,965, filed Apr. 16, 2020, fourteen pages.

Final Office Action mailed Aug. 4, 2023, for U.S. Appl. No. 17/254,832, filed Dec. 21, 2020, seventeen pages.

Final Office Action mailed Aug. 5, 2022, for U.S. Appl. No. 16/805,337, filed Feb. 28, 2020, eighteen pages.

Final Office Action mailed Jan. 11, 2023, for U.S. Appl. No. 17/214,446, filed Mar. 26, 2021, sixteen pages.

Final Office Action mailed Jan. 23, 2024, for U.S. Appl. No. 16/850,965, filed Apr. 16, 2020, fifteen pages.

Final Office Action mailed Oct. 6, 2021, for U.S. Appl. No. 16/805,337, filed Feb. 28, 2020, fourteen pages.

Final Office Action mailed Sep. 7, 2023, for U.S. Appl. No. 17/214,446, filed Mar. 26, 2021, nineteen pages.

Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf , 22 pages.

International Preliminary Report and Patentability mailed Dec. 22, 2020, for PCT Application No. PCT/US2019/038546, 13 pages.

International Preliminary Report and Written Opinion mailed Apr. 13, 2023, for PCT Application No. PCT/US2021/53046, filed Sep. 30, 2021, nine pages.

International Preliminary Report and Written Opinion mailed Apr. 25, 2024, for PCT Application No. PCT/US2022/078063, seven pages.

International Preliminary Report and Written Opinion mailed Oct. 28, 2021, for PCT Application No. PCT/US2020/028570, filed Apr. 16, 2020, 17 pages.

International Preliminary Report and Written Opinion mailed Sep. 16, 2021, for PCT Application No. PCT/US20/20469, filed Feb. 28, 2020, nine pages.

International Preliminary Report on Patentability and Written Opinion mailed Apr. 25, 2024, for PCT Application No. PCT/US2022/078073, seven pages.

International Preliminary Report on Patentability and Written Opinion mailed May 2, 2024, for PCT Application No. PCT/US2022/078298, twelve pages.

International Search Report and Written Opinion mailed Jan. 11, 2023, for PCT Application No. PCT/US2022/078298, seventeen pages.

International Search Report and Written Opinion mailed Jan. 24, 2022, for PCT Application No. PCT/US2021/53046, filed Sep. 30, 2021, fifteen pages.

International Search Report and Written Opinion mailed Jan. 17, 2023, for PCT Application No. PCTUS2022078073, thirteen pages.

International Search Report and Written Opinion mailed Jul. 2, 2020, for PCT Application No. PCT/US2020/028570, filed Apr. 16, 2020, nineteen pages.

International Search Report and Written Opinion mailed May 18, 2020, for PCT Application No. PCT/US20/20469, filed Feb. 28, 2020, twenty pages.

International Search Report and Written Opinion mailed Sep. 17, 2019, for PCT Application No. PCT/ US2019/038546, sixteen pages.

Jacob, R. "Eye Tracking in Advanced Interface Design", Virtual Environments and Advanced Interface Design, Oxford University Press, Inc. (Jun. 1995).

Japanese Final Office Action mailed May 31, 2024, for JP Application No. 2021-551538, with English translation, eighteen pages.

Japanese Notice of Allowance mailed Dec. 15, 2023, for JP Application No. 2020571488, with English translation, eight pages.

Japanese Office Action dated Jun. 2, 2023, for JP Application No. 2020 571488, with English translation, 9 pages.

Japanese Office Action mailed Jan. 30, 2024, for JP Application No. 2021-551538, with English translation, sixteen pages.

Japanese Office Action mailed May 2, 2024, for JP Application No. 2021-562002, with English translation, sixteen pages.

Kitayama, K. et al. (Sep. 30, 2003). "Speech Starter: Noise-Robust Endpoint Detection by Using Filled Pauses." Eurospeech 2003, retrieved on Jun. 17, 2020, retrieved from the internet URL: http://clteseerx.ist.psu.edu/viewdoc/download? doi=10 .1.1.141.1472 &rep=rep1&type=pdf entire document, pp. 1237-1240.

Liu, Baiyang, et al.: (Sep. 6, 2015). "Accurate Endpointing with Expected Pause Duration," INTERSPEECH 2015, pp. 2912-2916, retrieved from: a href="https://scholar.google.com/scholar?q=BAIYANG" target="_blank" https://scholar.google.com/scholar?q=BAIYANG/a,+Liu+et+al.:+(September+6,+2015).+"Accurate+endpointing+with+expected+pause+duration,&hl=en&as_sdt=0&as_vis=1&oi=scholart.

Non-Final Office Action mailed Apr. 12, 2023, for U.S. Appl. No. 17/214,446, filed Mar. 26, 2021, seventeen pages.

Non-Final Office Action mailed Apr. 13, 2023, for U.S. Appl. No. 17/714,708, filed Apr. 6, 2022, sixteen pages.

Non-Final Office Action mailed Apr. 27, 2023, for U.S. Appl. No. 17/254,832, filed Dec. 21, 2020, fourteen pages.

Non-Final Office Action mailed Aug. 10, 2022, for U.S. Appl. No. 17/214,446, filed Mar. 26, 2021, fifteen pages.

Non-Final Office Action mailed Jun. 23, 2023, for U.S. Appl. No. 18/148,221, filed Dec. 29, 2022, thirteen pages.

Non-Final Office Action mailed Jun. 24, 2021, for U.S. Appl. No. 16/805,337, filed Feb. 28, 2020, fourteen pages.

(56) References Cited

OTHER PUBLICATIONS

Non-Final Office Action mailed Mar. 17, 2022, for U.S. Appl. No. 16/805,337, filed Feb. 28, 2020, sixteen pages.
Non-Final Office Action mailed Mar. 27, 2024, for U.S. Appl. No. 16/850,965, filed Apr. 16, 2020, sixteen pages.
Non-Final Office Action mailed Nov. 17, 2021, for U.S. Appl. No. 16/987,267, filed Aug. 6, 2020, 21 pages.
Non-Final Office Action mailed Oct. 4, 2021, for U.S. Appl. No. 16/850,965, filed Apr. 16, 2020, twelve pages.
Non-Final Office Action mailed Sep. 15, 2023, for U.S. Appl. No. 16/850,965, filed Apr. 16, 2020, fourteen pages.
Non-Final Office Action mailed Sep. 29, 2022, for U.S. Appl. No. 16/850,965, filed Apr. 16, 2020, fifteen pages.
Notice of Allowance mailed Dec. 15, 2023, for U.S. Appl. No. 17/214,446, filed Mar. 26, 2021, seven pages.
Notice of Allowance mailed Jul. 31, 2023, for U.S. Appl. No. 17/714,708, filed Apr. 6, 2022, eight pages.
Notice of Allowance mailed Jun. 5, 2024, for U.S. Appl. No. 18/459,342, filed Aug. 31, 2023, eight pages.
Notice of Allowance mailed Mar. 3, 2022, for U.S. Appl. No. 16/987,267, filed Aug. 6, 2020, nine pages.
Notice of Allowance mailed Nov. 30, 2022, for U.S. Appl. No. 16/805,337, filed Feb. 28, 2020, six pages.
Notice of Allowance mailed Oct. 12, 2023, for U.S. Appl. No. 18/148,221, filed Dec. 29, 2022, five pages.
Notice of Allowance mailed Oct. 17, 2023, for U.S. Appl. No. 17/254,832, filed Dec. 21, 2020, sixteen pages.
Rolland, J. et al., "High-resolution inset head-mounted display", Optical Society of America, vol. 37, No. 19, Applied Optics, (Jul. 1, 1998).
Shannon, Matt et al. (Aug. 20-24, 2017). "Improved End-of-Query Detection for Streaming Speech Recognition", INTERSPEECH 2017, Stockholm, Sweden, pp. 1909-1913.
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Tonges, R. (Dec. 2015). "An augmented Acoustics Demonstrator with Realtime stereo up-mixing and Binaural Auralization," Technische University Berlin, Audio Communication Group, retrieved on Aug. 22, 2019, Retrieved from the Internet: URL: https://www2.ak.tu-berlin.de/~akgroup/ak_pub/abschlussarbeiten/2015/ToengesRaffael_MasA.pdf 100 pages.
Yoshida, A. et al., "Design and Applications of a High Resolution Insert Head Mounted Display", (Jun. 1994).
Chinese Notice of Allowance dated Nov. 7, 2024, for CN Application No. 201980050714.4, with English translation, 6 pages.
Hatashima, Takashi et al. "A study on a subband acoustic echo chaceller using a single microphone, Institute of Electronics, Information and Communication Engineers technical research report", Feb. 1995, vol. 94, No. 522, p. 1-8 (document showing a well-known technique). Note: An English language abstract can be found on the cover page.
Japanese Office Action mailed Nov. 7, 2024, for JP Application No. 2023-142856, with English translation, 12 pages.
Non-Final Office Action mailed Nov. 6, 2024, for U.S. Appl. No. 16/850,965, filed Apr. 16, 2020, twenty pages.
European Notice of Allowance dated Jul. 15, 2024, for EP Application No. 20791183.5 nine pages.
Final Office Action mailed Jul. 17, 2024, for U.S. Appl. No. 16/850,965, filed Apr. 16, 2020, seventeen pages.
Japanese Notice of Allowance mailed Aug. 21, 2024, for JP Application No. 2021-562002, with English translation, 6 pages.
Japanese Notice of Allowance mailed Oct. 28, 2024, for JP Application No. 2021-551538 with English translation, 6 pages.
Non-Final Office Action mailed Aug. 26, 2024, for U.S. Appl. No. 18/418,131, filed Jan. 19, 2024, ten pages.
Non-Final Office Action mailed Aug. 26, 2024, for U.S. Appl. No. 18/506,866, filed Nov. 10, 2023, twelve pages.
Chinese Notice of Allowance dated Feb. 18, 2025, for CN Application No. 202080044362.4, with English translation, 7 pages.
European Search Report dated Jan. 20, 2025, for EP Application No. 24221982.2 nine pages.
Kaushik, Mayank, et al. "Three Dimensional Microphone and Source Position Estimation Using TDOA and TOF Measurements." 2011 IEEE International Conference on Signal Processing, Communications and Computing (ICSPCC). IEEE, 2011. (Year: 2011).
Non-Final Office Action mailed Jan. 24, 2025, for U.S. Appl. No. 18/510,376, filed Nov. 15, 2023, seventeen pages.
Non-Final Office Action mailed Mar. 4, 2025, for U.S. Appl. No. 18/029,355, filed Mar. 29, 2023, ten pages.
Notice of Allowance mailed Dec. 11, 2024, for U.S. Appl. No. 18/418,131, filed Jan. 19, 2024, seven pages.
Notice of Allowance mailed Dec. 19, 2024, for U.S. Appl. No. 18/506,866, filed Nov. 10, 2023, five pages.
Chinese Office Action dated Feb. 12, 2025, for CN Application No. 202080031993.2, with English translation, 18 pages.
Japanese Office Action mailed Apr. 16, 2025, for JP Application No. 2023-142856, with English translation, 6 pages.
Notice of Allowance (corrected) mailed May 7, 2025, for U.S. Appl. No. 16/850,965, filed Apr. 16, 2020, seven pages.
Notice of Allowance mailed Apr. 2, 2025, for U.S. Appl. No. 16/850,965, filed Apr. 16, 2020, ten pages.
Notice of Allowance mailed Apr. 25, 2025, for U.S. Appl. No. 18/510,376, filed Nov. 15, 2023, eight pages.

* cited by examiner

200

RIGHT SOURCE OF IMAGEWISE MODULATED LIGHT 2126
2110
2206
2118
2404
2120
2402
2406
2120
2118

VOICE PROCESSING FOR MIXED REALITY

CROSS REFERENCE TO RELATED APPLICATIONS

This application is a U.S. national stage application under 35 U.S.C. § 371 of International Application No. PCT/US2022/078063, filed internationally on Oct. 13, 2022, which, claims priority to U.S. Provisional Application No. 63/256,460, filed on Oct. 15, 2021, the contents of which are incorporated by reference herein in their entirety.

FIELD

This disclosure relates in general to systems and methods for rendering audio for a mixed reality environment, and specifically relates to sound rendering for real sound sources for a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of a XR system, sensory information corresponding to a virtual environment represented by data in a computer system. Such systems can offer a uniquely heightened sense of immersion and realism by combining virtual visual and audio cues with real sights and sounds.

As used herein, AR systems present a virtual environment that overlaps or overlays the real environment in at least one aspect. For example, an AR system could present the user with a view of a virtual environment overlaid on the user's view of the real environment, such as with a transmissive head-mounted display that presents a displayed image while allowing light to pass through the display into the user's eye. Similarly, an AR system could present the user with audio corresponding to the virtual environment, while simultaneously mixing in audio from the real environment. Similarly, as used herein, MR systems present a virtual environment that overlaps or overlays the real environment in at least one aspect, as do AR systems, and may additionally allow that a virtual environment in an MR system may interact with the real environment in at least one aspect. For example, a virtual character in a virtual environment may toggle a light switch in the real environment, causing a corresponding light bulb in the real environment to turn on or off. As another example, the virtual character may react (such as with a facial expression) to audio signals in the real environment. By maintaining presentation of the real environment, AR and MR systems may avoid some of the aforementioned drawbacks of VR systems; for instance, motion sickness in users is reduced because visual cues from the real environment (including users' own bodies) can remain visible, and such systems need not present a user with a fully realized 3D environment in order to be immersive. Further, AR and MR systems can take advantage of real world sensory input (e.g., views and sounds of scenery, objects, and other users) to create new applications that augment that input.

It can be desirable to present digital sounds to a user of a XR system in such a way that the sounds seem to be occurring—naturally and consistently with the user's expectations of the sound—in the user's real environment. Generally speaking, users expect that virtual sounds will take on the acoustic properties of the real environment in which they are heard. For instance, a user of a XR system in a large concert hall will expect the virtual sounds of the XR system to have large, cavernous sonic qualities; conversely, a user in a small apartment will expect the sounds to be more dampened, close, and immediate. In addition to matching virtual sounds with acoustic properties of a real and/or virtual environment, realism is further enhanced by spatializing virtual sounds. For example, a virtual object may visually fly past a user from behind, and the user may expect the corresponding virtual sound to similarly reflect the spatial movement of the virtual object with respect to the user.

Existing technologies often fall short of these expectations, such as by presenting virtual audio that does not take into account a user's surroundings or does not correspond to spatial movements of a virtual object, leading to feelings of inauthenticity that can compromise the user experience. Observations of users of XR systems indicate that while users may be relatively forgiving of visual mismatches between virtual content and a real environment (e.g., inconsistencies in lighting); users may be more sensitive to auditory mismatches. Our own auditory experiences, refined continuously throughout our lives, can make us acutely aware of how our physical environments affect the sounds we hear; and we can be hyper-aware of sounds that are inconsistent with those expectations. With XR systems, such inconsistencies can be jarring, and can turn an immersive and compelling experience into a gimmicky, imitative one. In extreme examples, auditory inconsistencies can cause motion sickness and other ill effects, as the inner ear is unable to reconcile auditory stimuli with their corresponding visual cues.

Rendering sound for a XR environment in a realistic manner to create an immersive experience for the user in can be difficult. For example, a user participating in a remote collaboration application, e.g., remote meeting environment, may sound like they are in a different acoustic environment than other participants. More specifically, the reverberation applied to virtual sounds, e.g., a voice of a remote participant, may not match the reverberation properties of the real environment of the user. In such examples, the virtual sound can be processed to include the reverberation properties of the real environment of the user as well as reverberation properties of the virtual space of the remote collaboration application. But the artificial reverberation may still sound different from the real environment of the user. Thus, there exists a need to improve the perceived congruence between the artificial reverberation applied to virtual sounds from a virtual and/or mixed reality environment and real sounds from the real environment.

BRIEF SUMMARY

Embodiments of the present disclosure provide systems and methods for rendering audio for a mixed reality environment. Methods according to embodiments of this disclosure include receiving an input audio signal, via a wearable device in communication with a mixed reality environment, the input audio signal corresponding to a sound source originating from a real environment. In some embodiments, the system can determine one or more acoustic properties associated with the mixed reality environment. In some embodiments, the system can determine a signal modification parameter based on the one or more acoustic properties associated with the mixed reality environment. In some embodiments, the system can apply the signal modification parameter to the input audio signal to determine a second audio signal. In some embodiments, the system can present the second audio signal to the user.

A wearable device according to embodiments of the present disclosure can include a display configured to display a view of a virtual environment, one or more sensors, one or more speakers, and one or more processors. In some embodiments, the one or more processors can be configured to perform a method including: receiving an input audio signal, via a wearable device in communication with a mixed reality environment, the input audio signal corresponding to a sound source originating from a real environment, determining one or more acoustic properties associated with the mixed reality environment, determining a signal modification parameter based on the one or more acoustic properties associated with the mixed reality environment, applying the signal modification parameter to the input audio signal to determine a second audio signal, and presenting the second audio signal to the user.

DETAILED DESCRIPTION

Figure 1A:
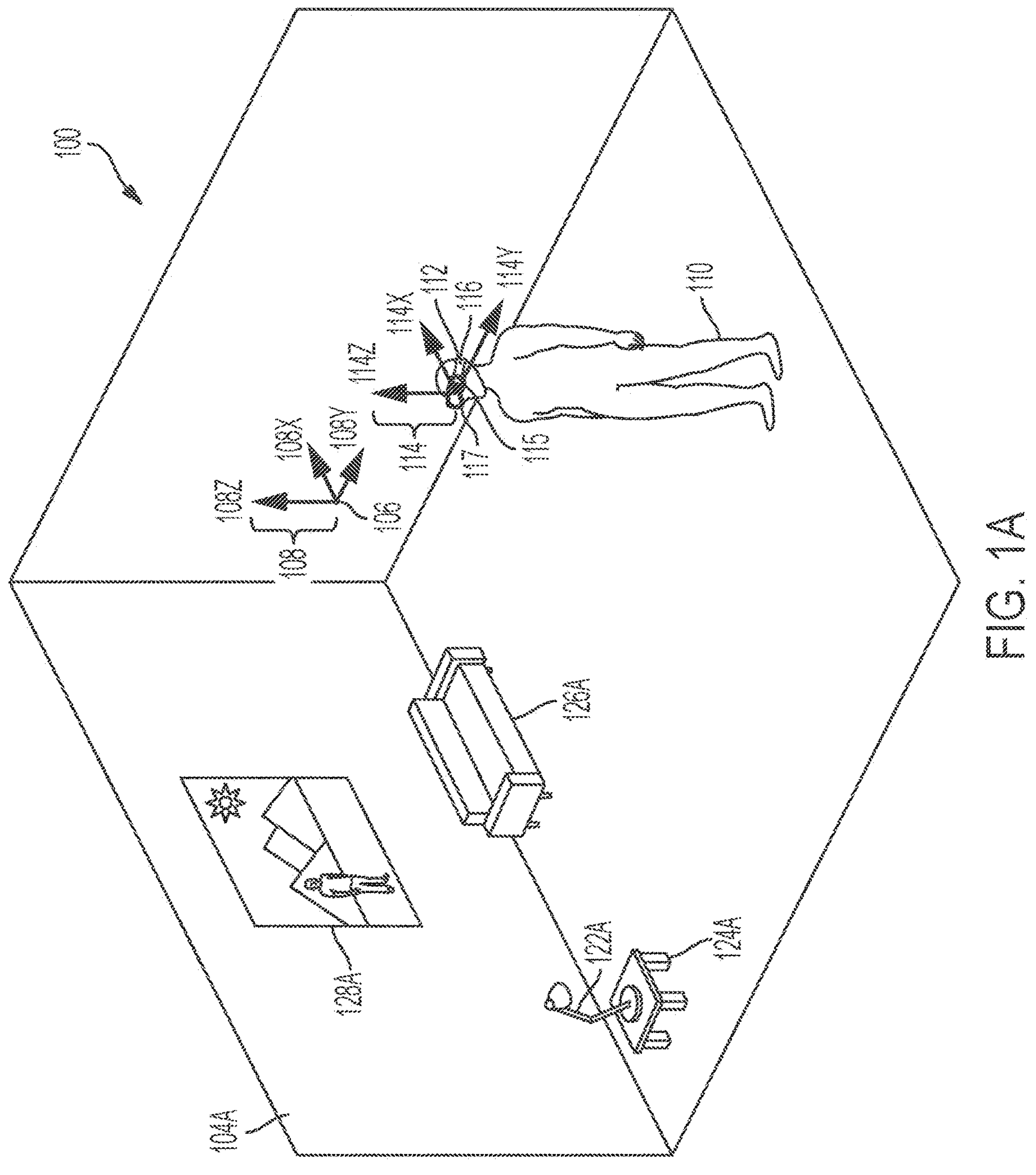
FIGS. 1A-IC illustrate an example mixed reality environment, according to one or more embodiments of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output;

software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the head-mounted wearable unit. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting a MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a location coordinate 106, which may be considered an origin of the real environment 100. As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a Quaternion matrix or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a Quaternion matrix or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
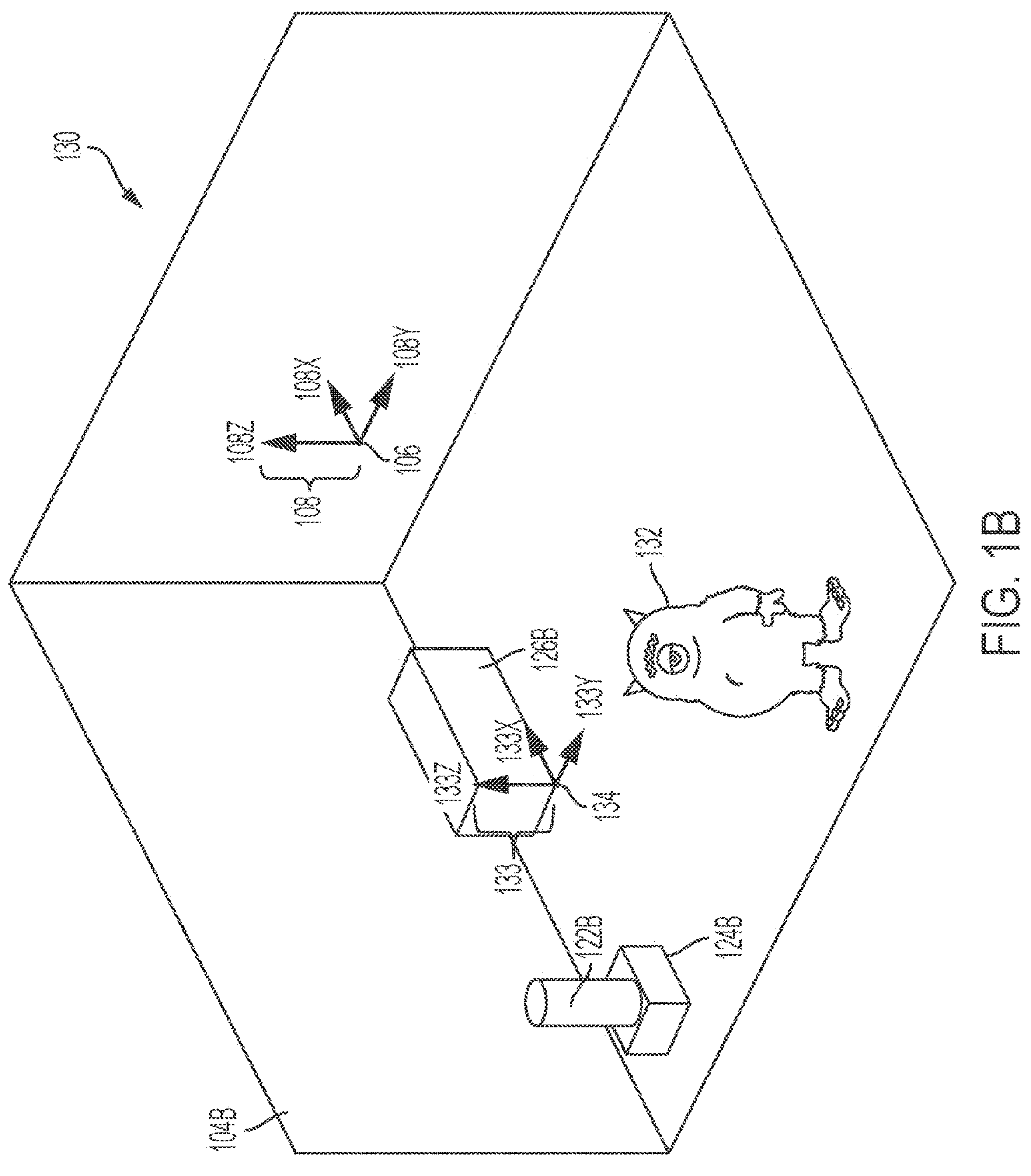

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, and 126A. Virtual environment 130 additionally comprises a virtual monster 132, which does not correspond to any real object in real environment 100. Real object 128A in real environment 100 does not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a Quaternion matrix or other rotation matrix), or other suitable representation can characterize a transformation between the persistent coordinate system 133 space and the environment/world coordinate system 108 space. In some embodiments, each of the virtual objects 122B, 124B, 126B, and 132 may have their own persistent coordinate point relative to the origin point 134 of the persistent coordinate system 133. In some embodiments, there may be multiple persistent coordinate systems and each of the virtual objects 122B, 124B, 126B, and 132 may have their own persistent coordinate point relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may only display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 1C:
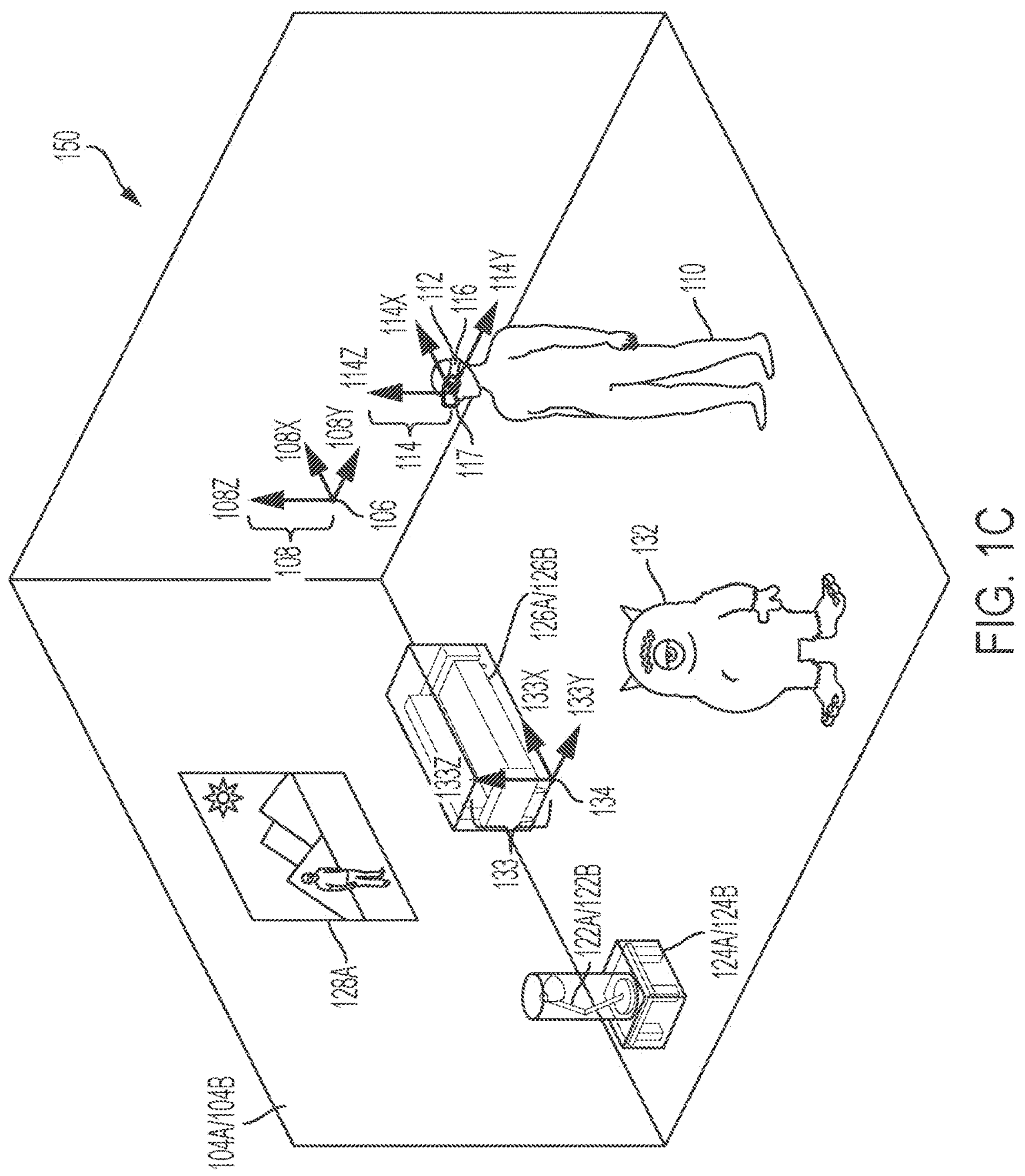

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, origin point 106 acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU)(e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2A:
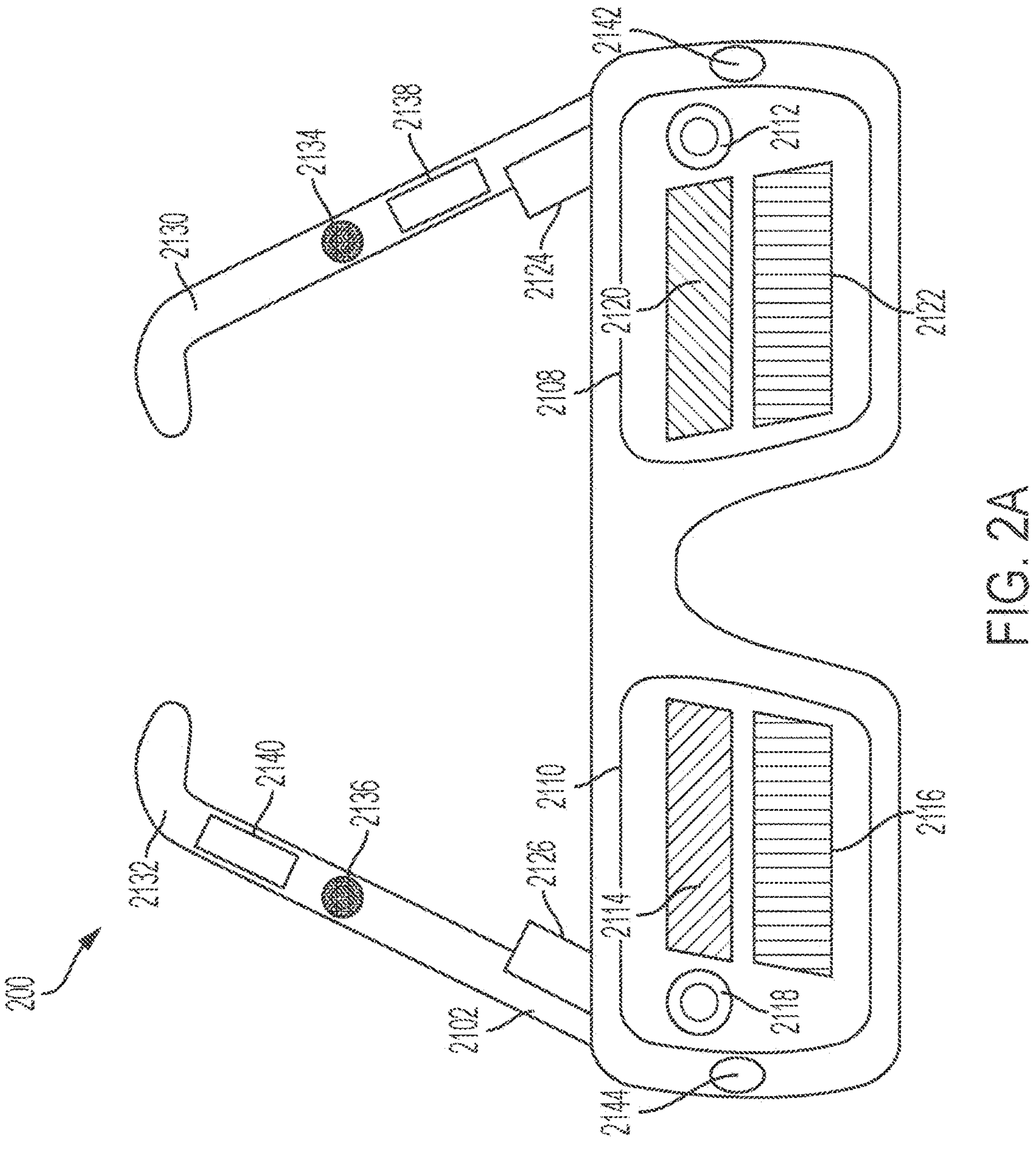
FIGS. 2A-2D illustrate components of an example mixed reality system that can be used to generate and interact with a mixed reality environment, according to one or more embodiments of the disclosure.
Figure 2B:
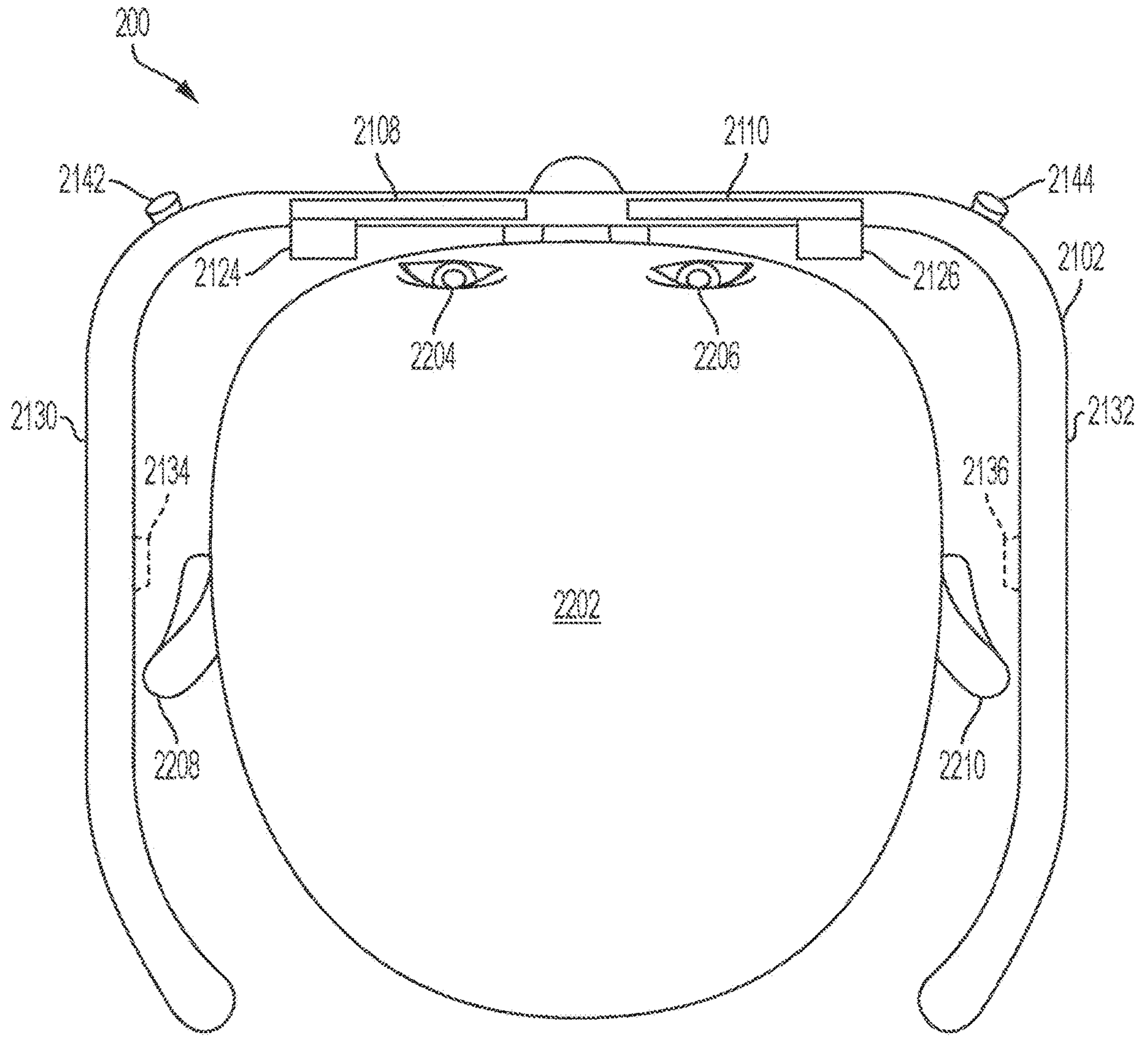
Figures 2C, 2D:
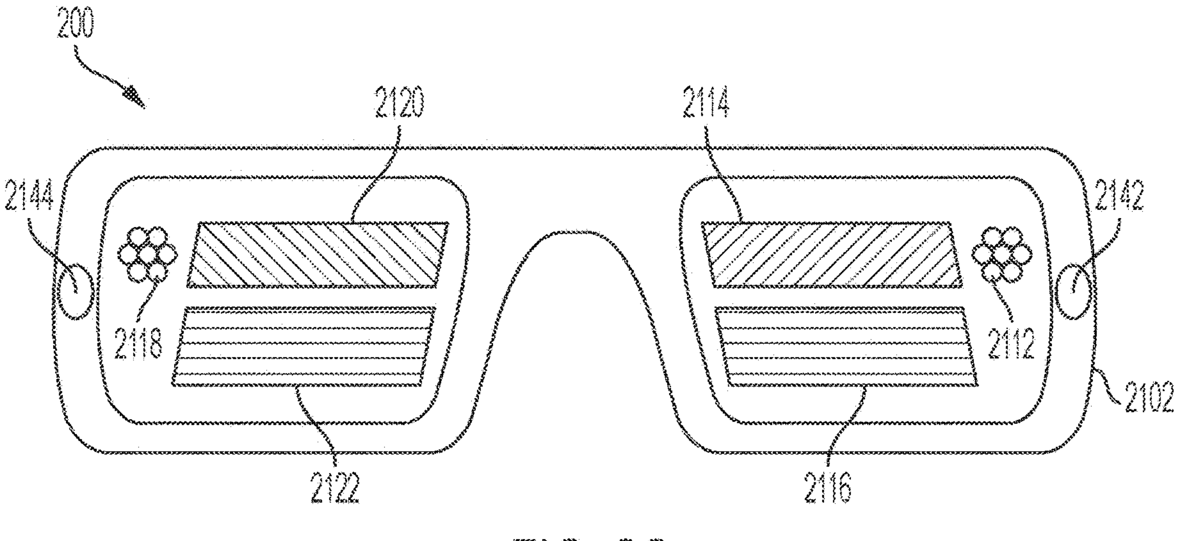

FIGS. 2A-2D illustrate components of an example mixed reality system 200 (which may correspond to mixed reality system 112) that may be used to present a MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an example left eyepiece (e.g., a left transparent waveguide set eyepiece) 2108 and an example right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left in-coupling grating set 2112, a left orthogonal pupil expansion (OPE) grating set 2120, and a left exit (output) pupil expansion (EPE) grating set 2122. As used herein, a pupil may refer to the exit of light from an optical element such as a grating set or reflector. Similarly, the right eyepiece 2110 can include a right in-coupling grating set 2118, a right OPE grating set 2114 and a right EPE grating set 2116. Imagewise modulated light can be transferred to a user's eye via the in-coupling gratings 2112 and 2118, OPEs 2114 and 2120, and EPE 2116 and 2122. Each in-coupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the in-coupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left in-coupling grating set 2112, and a right source of imagewise modulated light 2126 can be optically coupled into the right eyepiece 2110 through the right in-coupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the in-coupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. (Although not shown in FIG. 2D, the structure of the left eyepiece 2108 is analogous to the structure of the right eyepiece 2110.)

Figure 3A:
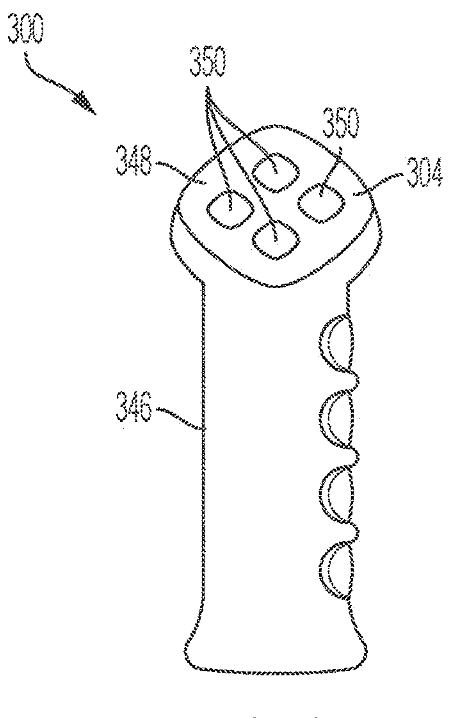
FIG. 3A illustrates an example mixed reality handheld controller that can be used to provide input to a mixed reality environment, according to one or more embodiments of the disclosure.

FIG. 3A illustrates an example handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
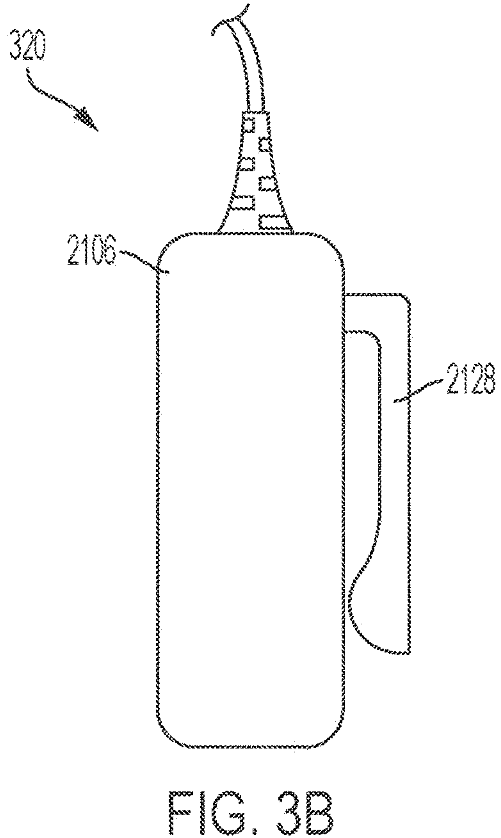
FIG. 3B illustrates an example auxiliary unit that can be used with an example mixed reality system, according to one or more embodiments of the disclosure.

FIG. 3B illustrates an example auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
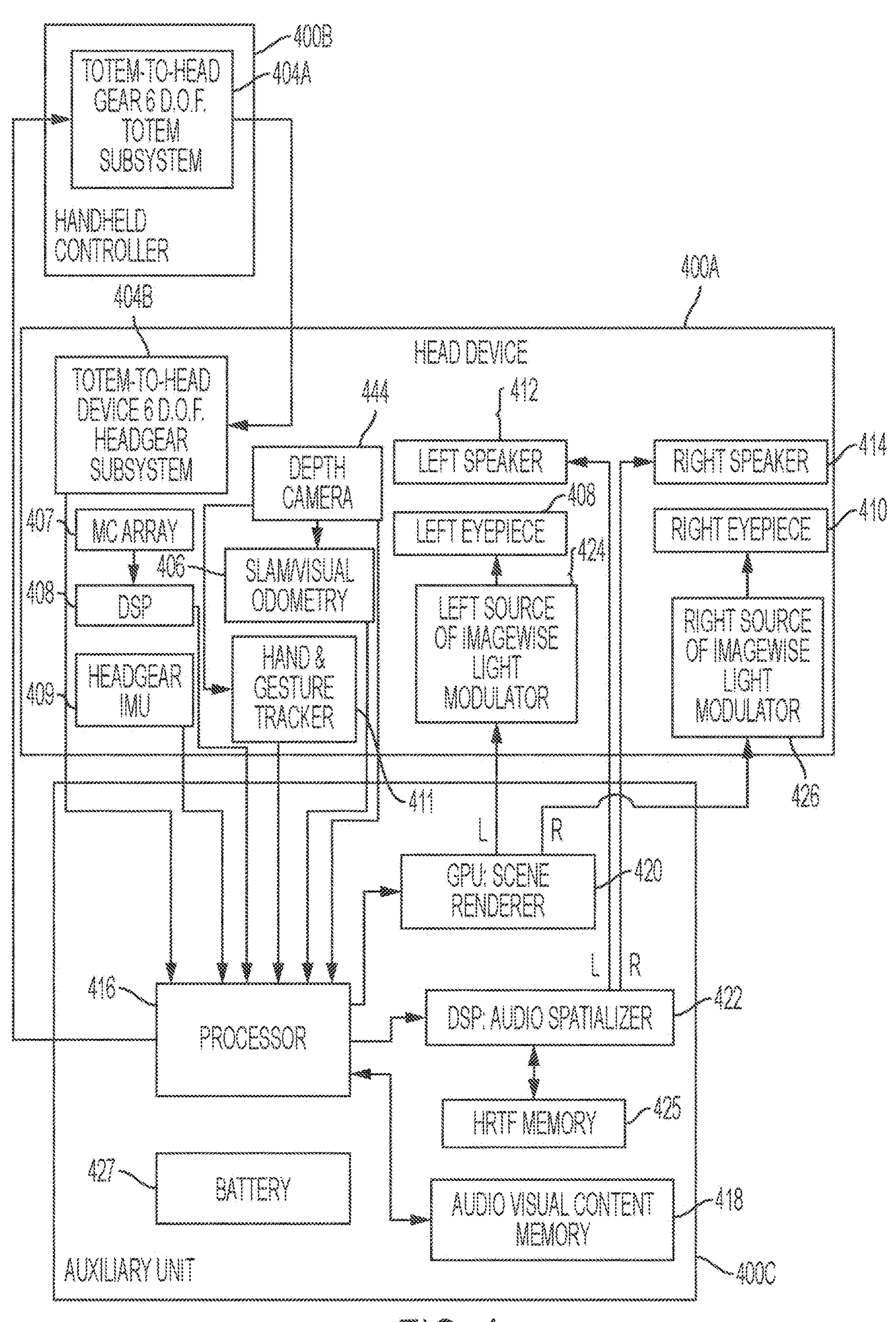
FIG. 4 illustrates an example functional block diagram for an example mixed reality system, according to one or more embodiments of the disclosure.

FIG. 4 shows an example functional block diagram that may correspond to an example mixed reality system, such as mixed reality system 200 described above (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described above with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with the wearable head device 400A or handheld controller 400B. Furthermore, some mixed reality systems may forgo entirely a handheld controller 400B or auxiliary unit 400C. Such changes and modifications are to be understood as being included within the scope of the disclosed examples.

Voice Processing

Rendering sound for a XR environment in a realistic manner to create an immersive experience for the user in can be difficult. In one or more examples, there may be a lack of congruence between sound originating in the real environment and sound originating in the virtual environment. For example, a user participating in a remote collaboration application may sound like they are in a different acoustic environment than other participants. More specifically, the reverberation applied to virtual sounds, e.g., one or more remote participant voices, may not match the reverberation properties of the real environment of the user. In such examples, the reverberation properties of the real environment of the user can be applied to one or more virtual sounds, e.g., one or more remote participant voices. But the artificial reverberation may still sound different from the real environment of the user. For example, the voice of the user may not sound as if it belongs in the virtual space. Similarly sounds originating in the real environment, e.g., another person talking in the real world environment, may not match sounds originating in the virtual environment. Accordingly, there is a need to provide users with an improved sense of immersion in an XR environment by presenting audio signals to the user that mimic a real-world sound source interacting with the XR environment.

In order to address the issues associated with the mismatch between reverberation and other propagation effects of sound originating in a virtual reality environment and sound originating in a real environment, systems and methods according to embodiments of this disclosure can apply artificial propagation effects, e.g., reverberation effects, corresponding to an XR environment to one or more sounds originating from the real world environment. In this manner, sounds originating from the real world environment, e.g., the user's voice, can be processed using the artificial propagation effects corresponding to the XR environment. Applying the artificial propagation effects to sound originating in the real world environment can mask the sound propagation effects of the real environment. This can improve the immersive experience of the user by convincing the user they are in the same acoustical space as the remote participants. In some embodiments, other propagation effects, e.g., reflections, occlusion, and/or diffraction, can be applied to sounds originating in the real environment in order to heighten the realism of virtual objects' acoustic presence.

Embodiments of the present disclosure provide systems and methods for rendering audio for a mixed reality environment. Methods according to embodiments of this disclosure include receiving an input audio signal, via a wearable device in communication with a mixed reality environment, the input audio signal corresponding to a sound source originating from a real environment. In some embodiments, the system can determine one or more acoustic properties associated with the mixed reality environment. In some embodiments, the system can determine a signal modification parameter based on the one or more acoustic properties associated with the mixed reality environment. In some embodiments, the system can apply the signal modification parameter to the input audio signal to determine a second audio signal. In some embodiments, the system can present the second audio signal to the user.

A wearable device according to embodiments of the present disclosure can include a display configured to display a view of a virtual environment, one or more sensors, one or more speakers, and one or more processors. In some embodiments, the one or more processors can be configured to perform a method including: receiving an input audio signal, via a wearable device in communication with a mixed reality environment, the input audio signal corresponding to a sound source originating from a real environment, determining one or more acoustic properties associated with the mixed reality environment, determining a signal modification parameter based on the one or more acoustic properties associated with the mixed reality environment, applying the signal modification parameter to the input audio signal to determine a second audio signal, and presenting the second audio signal to the user.

Figure 5A:
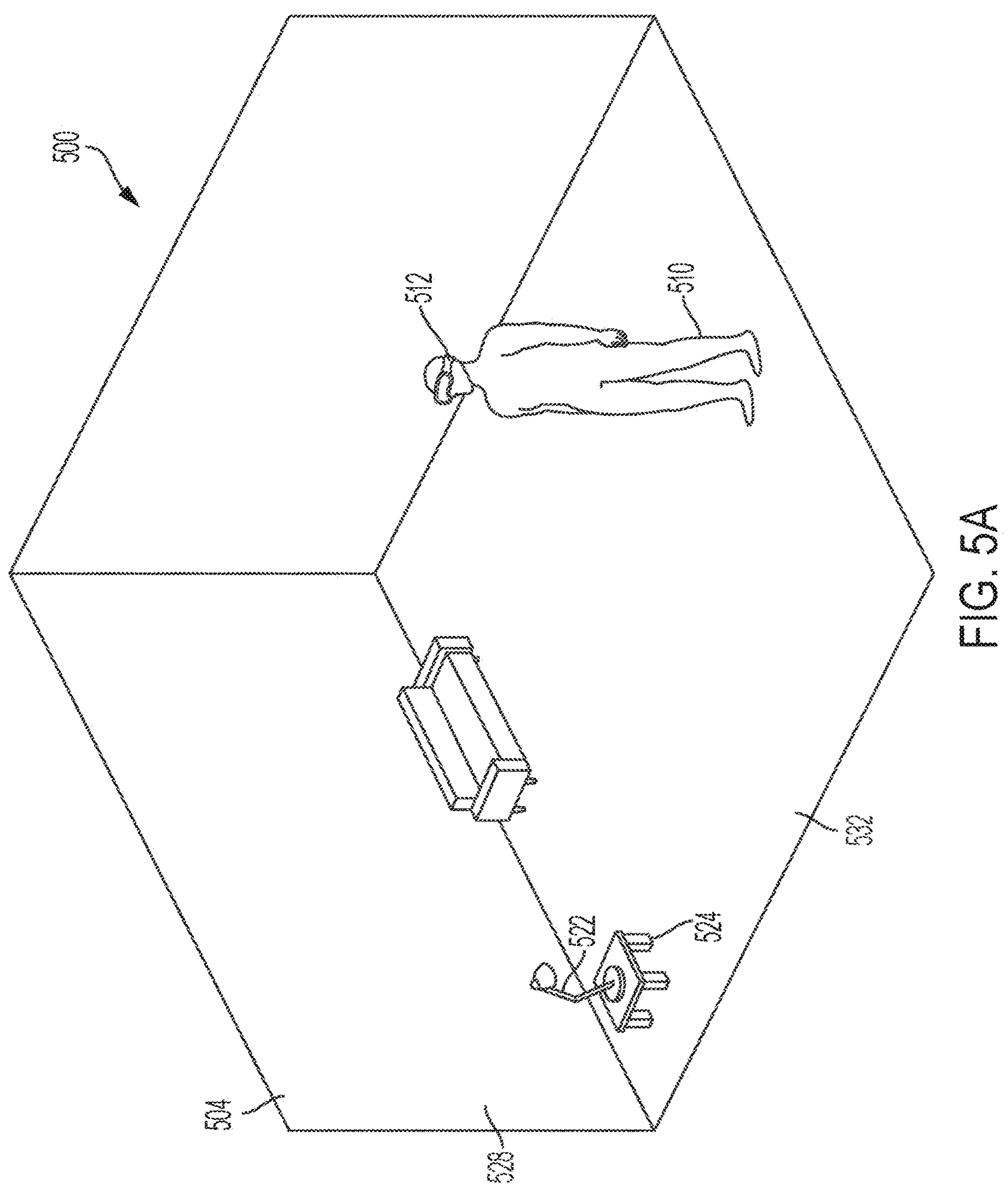
FIGS. 5A-5C illustrate an example mixed reality environment, according to one or more embodiments of the disclosure.

FIG. 5A illustrates an exemplary real environment 500 in which a user 510 uses a mixed reality system 512, according to embodiments of this disclosure. In one or more examples, mixed reality system 512 can correspond to mixed reality system 200 as discussed above. As shown in the figure, the real environment 500 can correspond to a room 504, in which user 510 is standing. The room 504 can include a floor 532 and one or more walls 528. As shown in the figure, room 504 can include one or more real objects such as 522 (a lamp) and 524 (a table). In one or more examples, real environment 500 can correspond to real environment 100. In some examples, the real environment 500 can be associated with one or more reverberation characteristics. For example, in some instances, the floor 532 can be carpeted and the one or more walls 528 can be drywall. Accordingly, the real environment 500 can have one or more reverberation characteristics associated with the carpeted floor 532 and/or the one or more drywall walls 528.

Figure 6A:
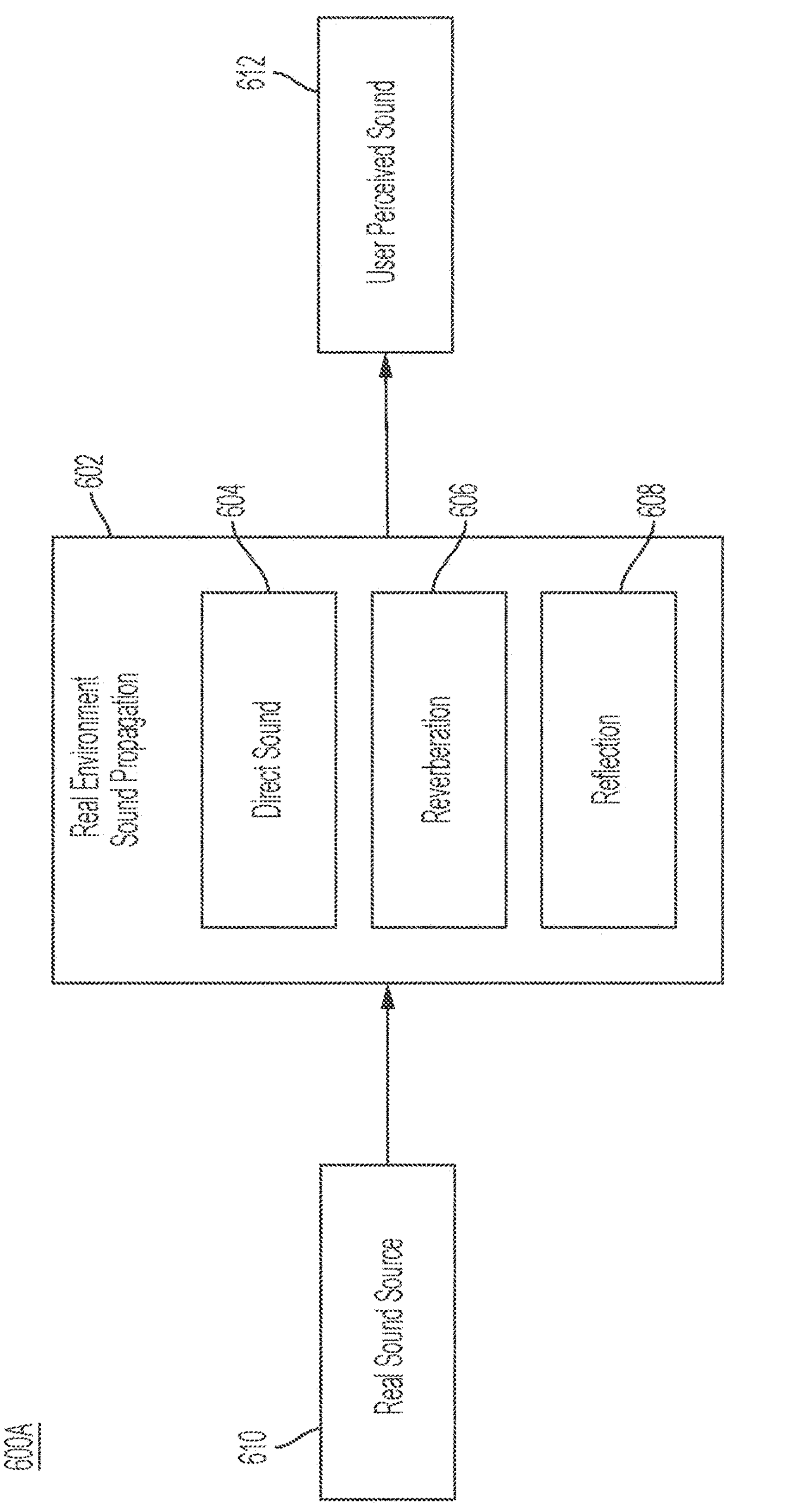
FIGS. 6A-6D illustrate exemplary sound propagation and/or processing for an example mixed reality system, according to one or more embodiments of the disclosure.

FIG. 6A illustrates exemplary sound propagation in a real environment. The real environment may be any suitable type of environment associated with one or more acoustic properties, e.g., real environment 500. A listener's audio experience in a space (e.g., a room) of a real environment can correspond to the real environment sound propagation 602, that can include that listener's perception of a direct sound 604; the listener's perception of reflections 608 of that direct sound against the surfaces of the room; and the listener's perception of reverberations ("reverb") 606 of the direct sound in the room. In some examples, the direct sound 604 corresponds to sound that originates at the source (e.g., the user's voice, a television, etc.) and travels directly toward the listener (e.g., the user's ear). The reflections 608 are sounds that originate at the source, reflect off a surface (e.g., a wall of the room), and travel to the listener. The reverberation 606 is sound that includes a decaying signal that includes many reflections arriving close to one another in time. As shown in the figure, a real sound source 610 can propagate along these paths to form user perceived sound 612.

Figure 5B:
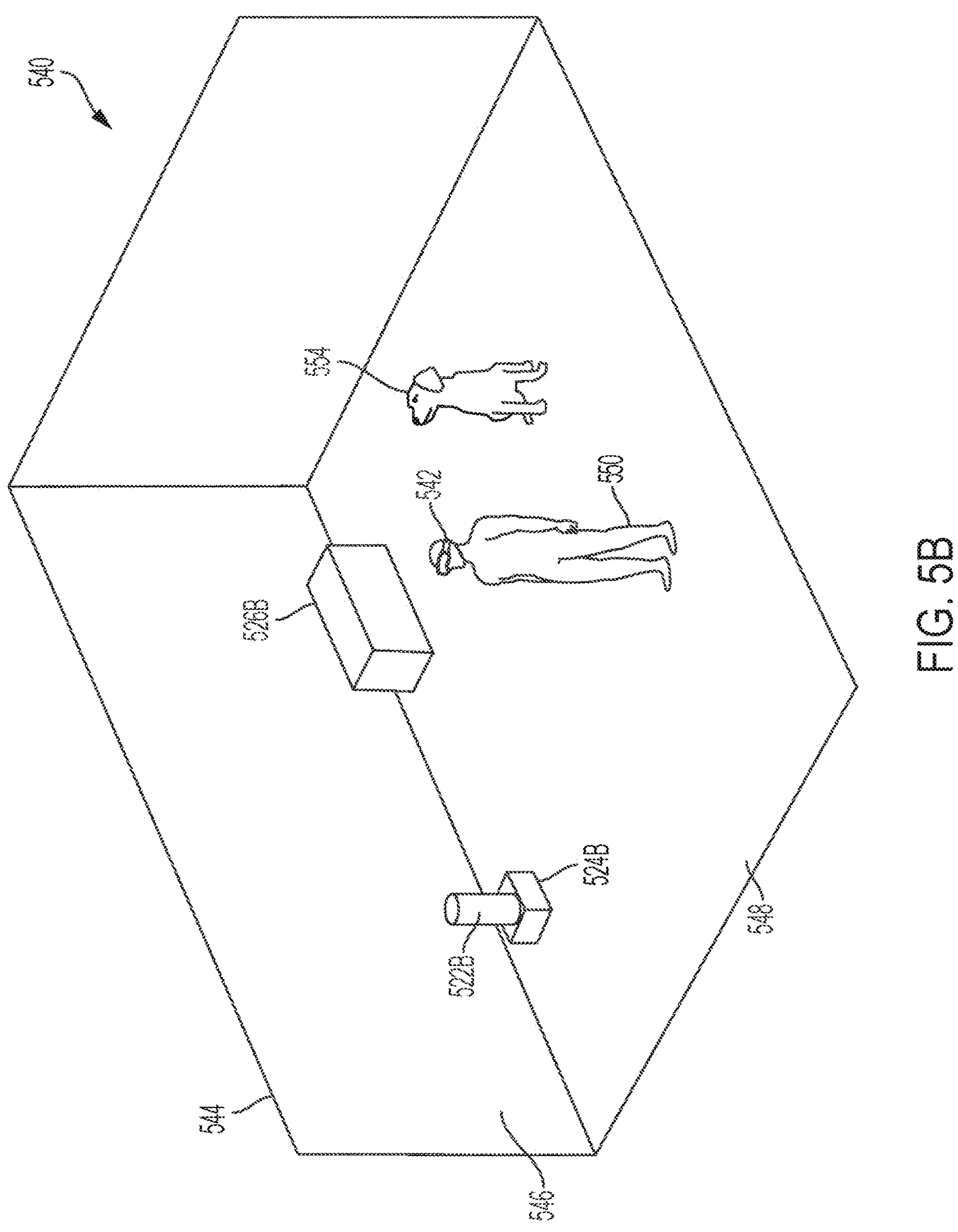

FIG. 5B illustrates an example virtual environment 540 that corresponds to real environment 500. The virtual environment 540 shown comprises a virtual rectangular room 544. As shown in the figure, the virtual room 544 can include the one or more walls 546 and a floor 548. In some examples, virtual rectangular room 544 can correspond to real rectangular room 504. In some examples, virtual rectangular room 544 may not correspond to real rectangular room 504, e.g., virtual rectangular room can have different dimensions and/or have surfaces made of a different material from real rectangular room 504. For example, the walls 546 may be made of a different material from the walls 528 of the real environment 500, e.g., the walls 546 can comprise wood while the walls 528 can comprise drywall. As another example, the floor 548 can be made of a different material from the floor 532 of the real environment 500, e.g., the floor 548 can comprise concrete while the floor 532 can comprise carpet. The types of materials used to form the walls and/or floor are merely exemplary, and other materials may be used without departing from the scope of this disclosure.

As shown in the figure, the virtual environment 540 can include a virtual object 522B corresponding to real object 522A; a virtual object 524B corresponding to real object 524A; and a virtual object 526B corresponding to real object 526A. Metadata associated with the virtual objects 522B, 524B, 526B can include information derived from the corresponding real objects 522A, 524A, and 526A. Virtual environment 540 can additionally include a virtual dog 554, which may not correspond to any real object in real environment 500. In some examples, the virtual environment 540 can correspond to a virtual collaboration environment. For example, the virtual environment 540 can include a remote user 550, who is using a second mixed reality system 542. The remote user 550 may not correspond to any real object in real environment 500. In some examples, the remote user may be using a second mixed reality system 552 that is in communication with the virtual environment 540.

Figure 6B:
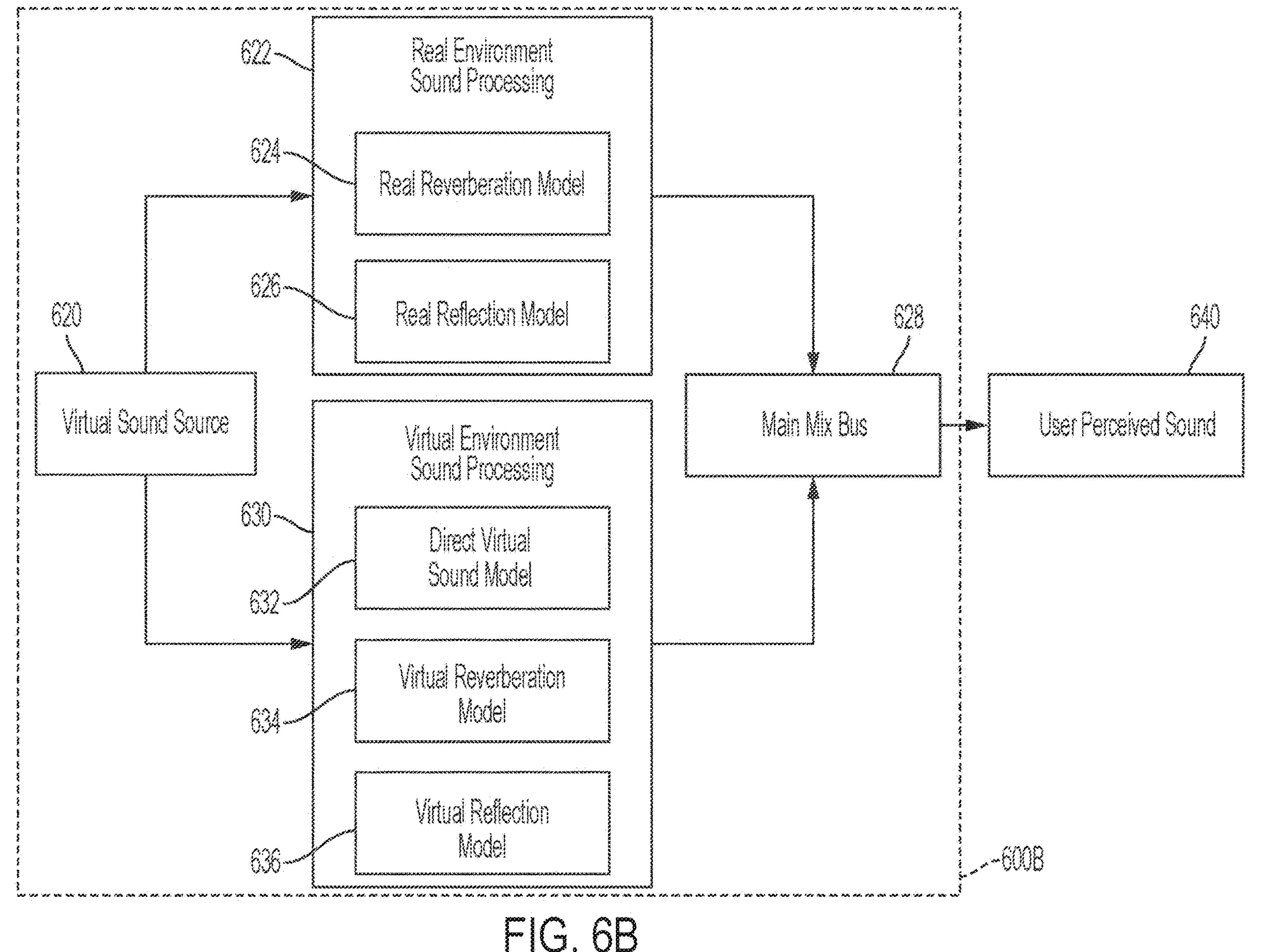

FIG. 6B illustrates exemplary virtual sound processing using system 600B for a virtual environment. As shown in the figure, the virtual sound processing using system 600B can include virtual environment sound processing module 630, real environment sound processing module 622, and/or a main mix bus 628. In one or more examples, the virtual environment sound processing module 630 can include one or more of a direct virtual sound model 632, a virtual reverberation model 634, and a virtual reflections model. In one or more examples, the real environment sound processing module 622 can include a real reverberation model 624 and/or a real reflection model 626.

For example, a listener's audio experience in a space (e.g., a room) of a virtual environment, e.g., virtual environment 540 may include that listener's perception of a virtual sound source 620 as it interacts with the virtual environment 540. For example, a virtual sound source can correspond to a voice of the remote user 550. For example, the virtual sound source 620 can be processed to include contributions from a direct virtual sound model 632; a virtual reflections model 636 of that direct virtual sound against the surfaces of the room; and/or a virtual reverberation model 634 of the direct virtual sound in the room. In some examples, the direct virtual sound model 632 corresponds to a virtual sound that originates at the source (e.g., the remote user's voice 550, the dog 554, etc.) and travels directly toward the listener (e.g., the ear of the user 510). The virtual reflection model 636 are sounds that originate at the source, reflect off a surface (e.g., a wall 546 of the room 544), and travel to the listener. In some embodiments, additional acoustic models corresponding to the virtual environment, e.g., occlusions and/or diffractions can be applied to the virtual sound source 620.

In some embodiments, virtual sound sources can be processed as disclosed in U.S. Pat. No. 10,863,300 entitled "SPATIAL AUDIO FOR INTERACTIVE AUDIO ENVIRONMENTS" the contents of which are incorporated by reference in its entirety.

In some examples, the listener's audio experience in the virtual environment can include that listener's perception of the virtual sound source 620 as it interacts with a real environment of the user, e.g., real environment 500. For example, real environment sound processing module 622 can be applied to the virtual sound source 620, including a real reflections module 626 that corresponds to the listener's perception of reflections of the direct virtual sound against the surfaces of the real environment of the user; and a real reverberation module 624 that corresponds to listener's perception of reverberations ("reverb") of the direct virtual sound in the real environment of the user. In one or more examples, the real environment sound processing module 622 can process a virtual sound source corresponding to a voice of a remote user 550 such that reverberations and reflections from the real world environment can applied to the voice of the remote user.

In this manner, the virtual sound 620 can appear to occur naturally and consistently with the user's expectations of the sound in the user's real environment, e.g., real environment 500. This can aid in creating an immersive environment, as the virtual sound can be presented to the user as if the virtual sound was originating in the same environment as the user. Accordingly, the sound perceived by the user from the virtual sound source 620 can correspond to contributions of virtual environment sound processing and real environment sound.

In some examples, one or more audio signals corresponding to one or more of the modules of the virtual environment sound processing module 630 (e.g., direct virtual sound model 632, virtual reflections model 636, and/or a virtual reverberation model 634) and the real environment sound processing (e.g., real reverberation module 624 and real reflections module 626) can be sent to main mix bus 628 while the FIG. illustrates the main mix bus 628 receiving audio signals corresponding to a virtual sound source 620, the main mix bus 628 can combine contributions from multiple sound sources as processed by the real environment sound processing module 622 and virtual environment sound processing module 630. The main mix bus 628 can derive an output rendering signal that can be presented to a user as user perceived sound 640.

Figure 5C:
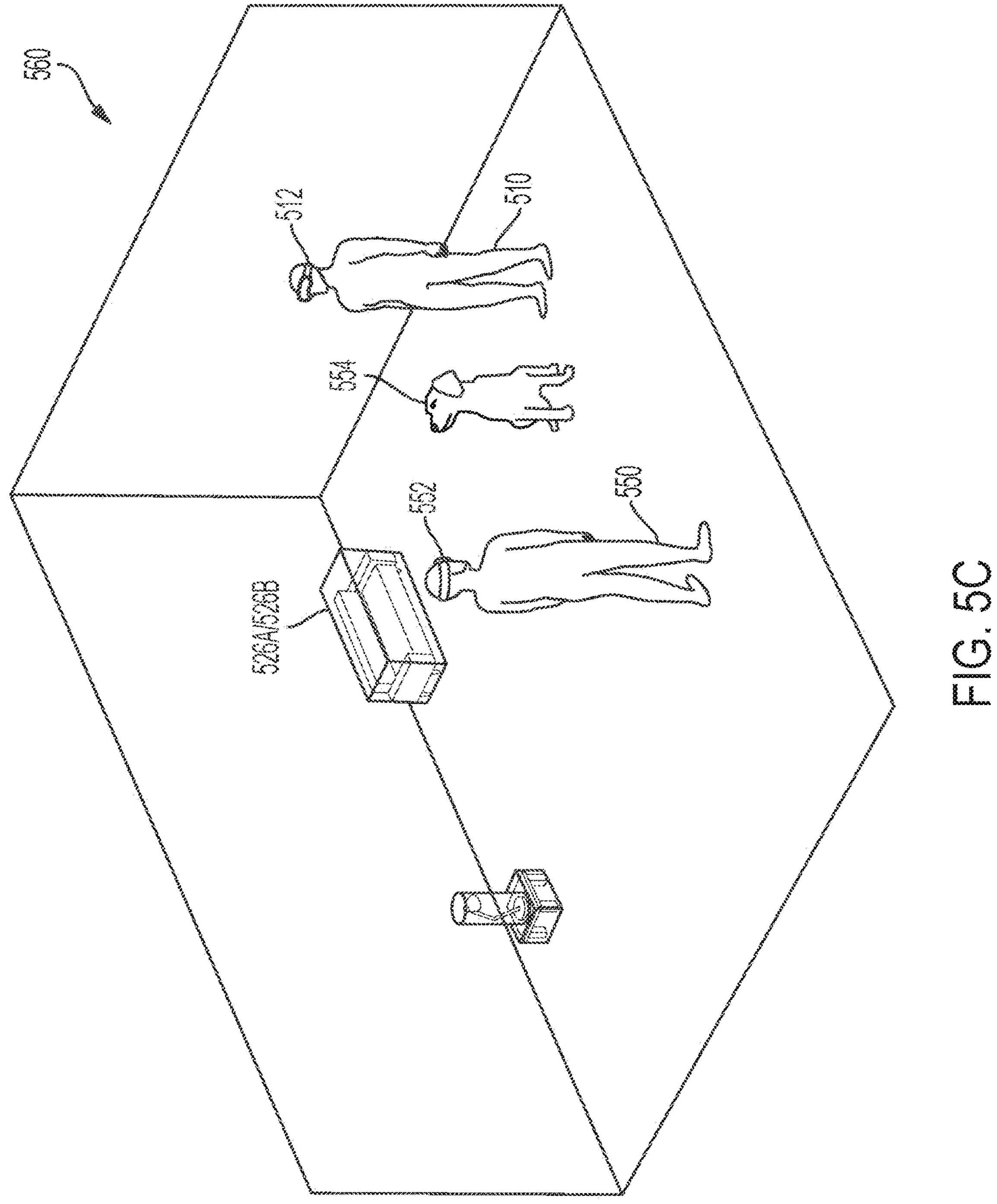

FIG. 5C illustrates an exemplary MRE 560 that simultaneously presents aspects of real environment 500 and virtual environment 540 to user 510 via mixed reality system 512. In the example shown, MRE 560 can simultaneously present user 510 with real objects 522A, 524A, and 526A from real environment 500 (e.g., via a transmissive portion of a display of mixed reality system 512); and virtual objects 522B, 524B, 526B, 550, and 554 from virtual environment 540 (e.g., via an active display portion of the display of mixed reality system 112).

In some embodiments, mixed reality environment 560 can correspond to a remote collaboration application, e.g., remote meeting environment. For example, first user 510 and remote user 550 may be conversing in the mixed reality environment 560. In some examples, the speech generated by the first user 510 can correspond to a real sound source while the speech generated by the remote user 550 can correspond to a virtual sound source. In order to provide an immersive experience for the first user 510, audio signals corresponding to one or more virtual sound sources, e.g., the speech generated by the remote user 550, can be processed by system 600B as discussed above. In this manner, the virtual sound generated by the remote user 550 may appear to occur naturally and consistently with the user's expectations of the sound in the user's real environment.

In some examples, even when the propagation parameters from the real environment 500 are applied to the virtual sound sources, the virtual sound sources, e.g., speech generated by the remote user 550, may sound different from real sound sources that originate in the real environment 500, e.g., speech generated by the first user 510. For example, the speech generated by the user 510 may propagate as discussed above with respect to FIG. 6A, e.g., the user-perceived sound 612 may correspond to a contribution of direct sound 602, reverberation 604, and one or more reflections 606 of the real sound source 610. Thus, while a virtual sound source 620 perceived by the user may include contributions from both the real environment and virtual environment, the real sound source 610 perceived by the user may include contributions from just the real environment, which can contribute the user's perception that the virtual sound source 620 and the real sound source 610 are not in the same acoustic space.

According to examples of this disclosure, one or more virtual environment sound processing models can be applied to real sound sources, e.g., sound sources originating in the real environment of a user. In other words, sounds from the real world, e.g., the user's voice can be captured and treated as a virtual sound source, in order to generate virtual reflections of the real-world voice off virtual objects. In this manner, the congruence between sound originating in the real environment and sound originating in the virtual environment sound can be improved because the real environment sound, e.g., the user's voice, can be processed in a similar manner to one or more virtual sources such that the user can perceive acoustic contributions from both the XR environment and real environment.

Figure 6C:
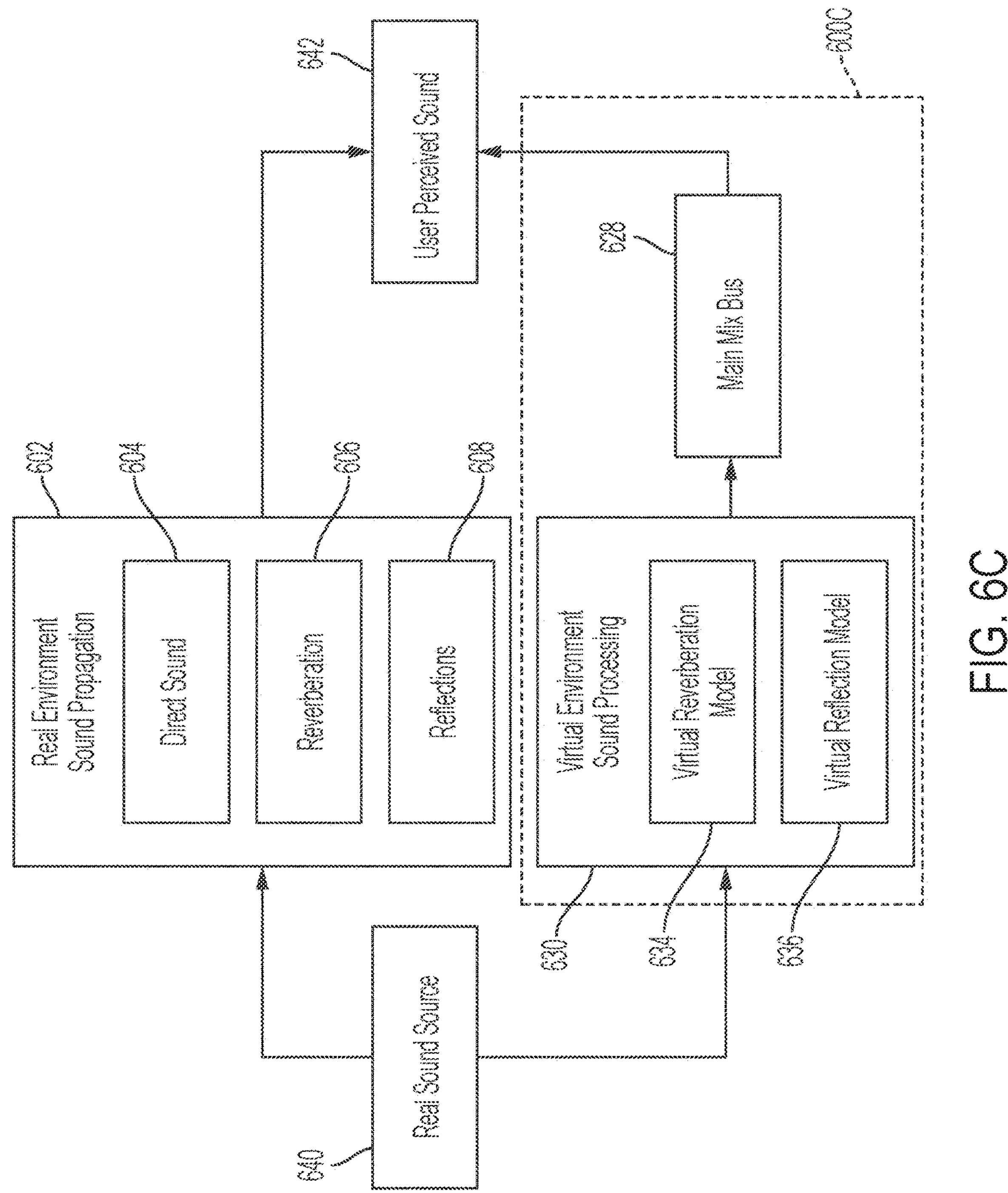

FIG. 6C illustrates exemplary real sound propagation for a mixed reality environment, e.g., corresponding to MRE 560, using system 600C, according to embodiments of the present disclosure. As shown in the figure, system 600C can include at least virtual environment sound processing module 630 and main mix bus 628. According to embodiments of this disclosure, a listener's audio experience in a space (e.g., a room) of a MRE (e.g., MRE 560) may include that listener's perception of a real sound source 640 as it interacts with both the MRE (e.g., MRE 560) and the real environment (e.g., real environment 500). For example, the real sound source 640 can undergo real environment sound propagation 602 as described above with respect to FIG. 6A. Moreover, the listener's audio experience in the MRE environment can further include that listener's perception of the real sound source 640 as it interacts with the MRE (e.g., MRE 560). For example, the system 600C can apply virtual environment sound processing to the real sound source 640. As shown in the figure, the virtual environment sound processing module 630 can include contributions from a virtual reflections model 636 corresponding to the direct real sound against the surfaces of the MRE and a virtual reverberation model 634 corresponding to the reverberation of the of the direct real sound in the MRE. In some embodiments, additional acoustic models corresponding to the virtual environment, e.g., occlusions and/or diffractions can be applied to the real sound source 640. As shown in the figure, the output from the module 630 can be sent to main mix bus 628. As discussed above, main mix bus 628 can combine outputs from one or more modules to derive an output rendering signal that can be presented to the user as a user perceived sound 642.

Figure 6D:
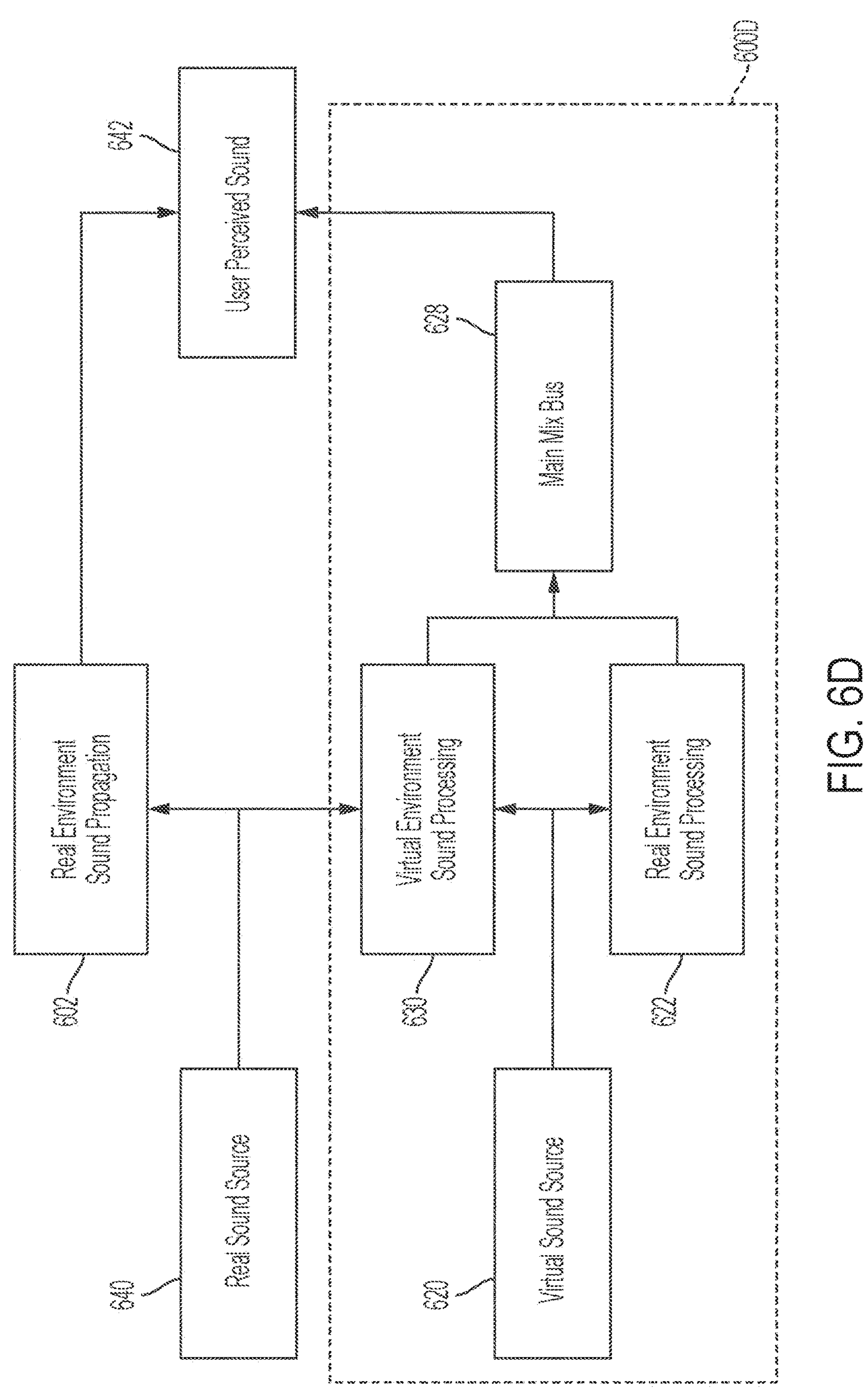

FIG. 6D illustrates the sound propagation and/or sound processing of both real sound sources 640 and virtual sound sources 620 in a mixed reality environment (e.g., MRE 560) using system 600D, according to embodiments of the present disclosure. As shown in the figure, real sound sources 640 can experience real environment sound propagation 602 as well as virtual environment sound processing module 630, as described above with respect to system 600C. Virtual sound sources 620 can undergo both virtual environment sound processing module 630 and real environment sound processing module 622, as described above with respect to system 600B. Signals processed via the virtual environment sound processing module 630 and real environment sound processing module 622 can be sent to main mix bus 628, which can combine contributions from all sources derive an output rendering signal to be presented to the user. In some examples, the user perceived sound 642 can correspond to the contribution of the real environment sound propagation as well as the output rendering signal.

Accordingly, the real and virtual sounds perceived by the user may appear to originate from a same acoustic space because each sound source, whether real or virtual can include acoustic contributions from the virtual environment sound processing and real environment sound propagation/processing. In this manner, systems and methods according to this disclosure can enhance the immersive experience of a user, as the real sound source 640, e.g., a user's voice, and the virtual sound source 620, e.g., a remote user's voice, can appear to originate from the same acoustic space.

Figure 7:
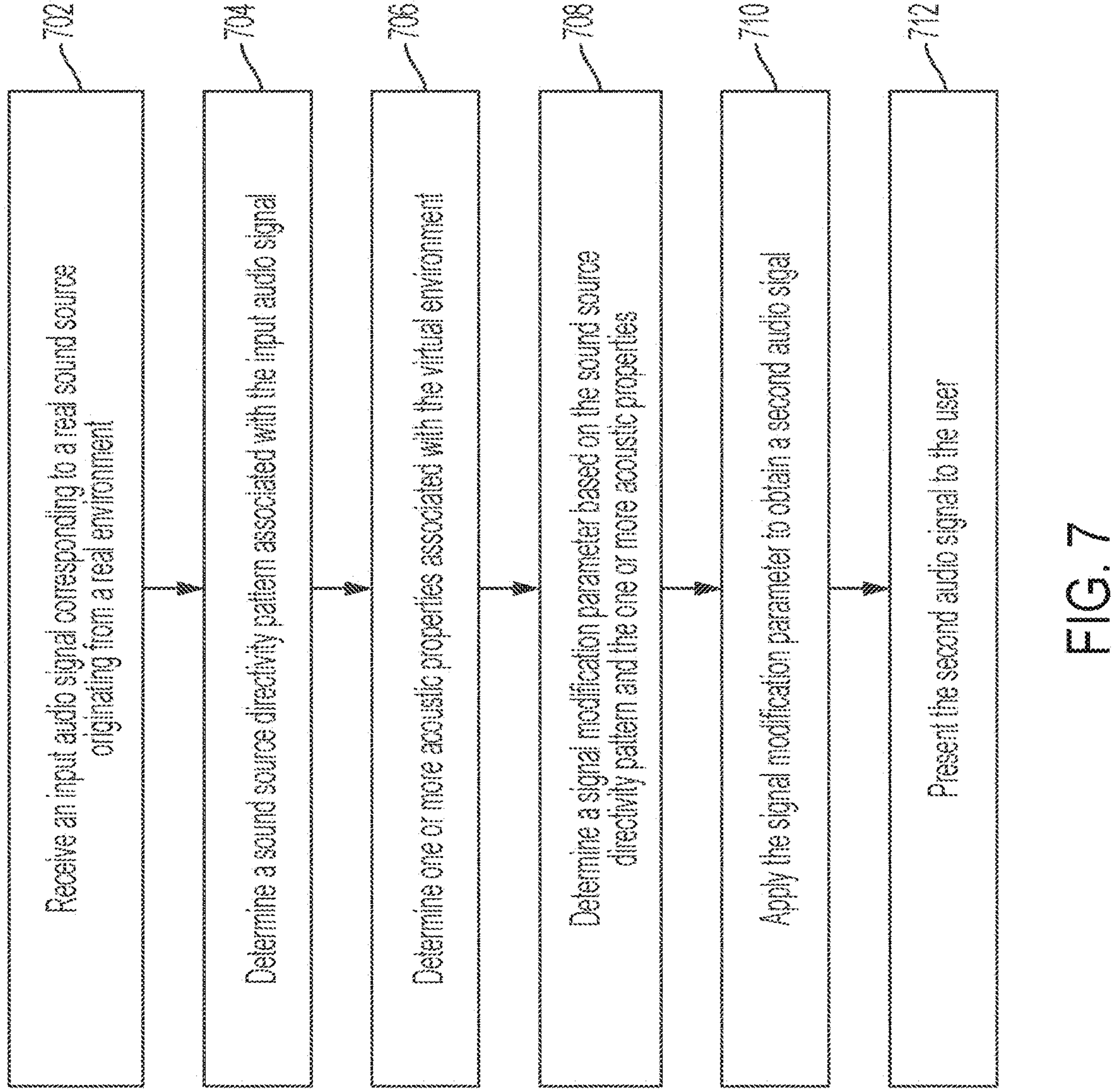
FIG. 7 illustrates an example flow chart of a process for processing an audio signal for an example mixed reality system, according to one or more embodiments of the disclosure. FIGs.

FIG. 7 illustrates a flow chart of a process 700 for modifying a real sound source for an example mixed reality system, according to one or more embodiments of the disclosure. Process 700 can be performed, for example, using one or more electronic devices implementing a software platform. In some examples, process 700 can be performed using a client-server system, and the blocks of process 700 can be divided up in any manner between the server and one or more client devices. Thus, while portions of process 700 are described herein as being performed by particular devices of a client-server system, it will be appreciated that process 700 is not so limited. In other examples, process 700 can be performed using only a client device or only multiple client devices. In process 700, some blocks can be, optionally, combined, the order of some blocks can be, optionally, changed, and some blocks can be, optionally, omitted. In some examples, additional steps may be performed in combination with the process 700. Accordingly, the operations as illustrated (and described in greater detail below) are exemplary by nature and, as such, should not be viewed as limiting.

At step 702, the mixed reality system can receive an input audio signal corresponding to a real sound source originating from the real environment of the user. In some examples, it may be advantageous that the input audio signal corresponds to a dry audio signal, e.g., the sound is captured without the acoustic contributions of reflections of nearby surfaces and/or room reverberation. For example, capturing a dry audio signal can avoid masking an artificial reverberation in instances where the real room reverberation is greater than the time of the artificial reverberation. Additionally, capturing a dry audio signal can reduce the amount of signal pre-processing for cleaning the signal corresponding to the real environment sound source, which improve latency as the artificial reverberation applied to the real sound source should be heard with the same amount of delay as reverberation applied to the virtual sound sources. For example, referring to real environment 500, the real sound source can correspond to a voice of the user 510. In one or more examples, the real sound source can be captured using one or more microphones of a mixed reality system, e.g., mixed reality system 200. In some embodiments, the captured input audio signal can be processed to remove the acoustic signature, e.g., reverberation and reflections, of the real environment from the captured audio signal to create a dry audio signal. In some examples, the captured input audio signal can be processed to isolate a sound corresponding to the real sound source.

At step 704, the system can determine a sound source directivity pattern associated with the input audio signal. A sound source directivity pattern or radiation pattern may refer to a measure of how much energy a sound source is emitting in different directions. The sound source directivity can have an effect on all parts of a room impulse response (e.g., direct sound, reflections, and/or reverberations). Different sound sources may exhibit different directivity patterns—for example, a trumpet may exhibit a very directional radiation pattern, e.g., corresponding to a position of the horn, while a balloon popping may exhibit a more uniform directional radiation pattern, emanating relatively evenly in all directions. Room simulation models may take sound source directivity into account when producing accurate simulations of acoustic signals. For example, a model incorporating sound source directivity may include a function of direction of line from a sound source to a listener relative to a front direction (or main acoustical axis) of the sound source. In some examples, the directivity pattern is axisymmetric about a main acoustical axis of the sound source.

Figure 8:
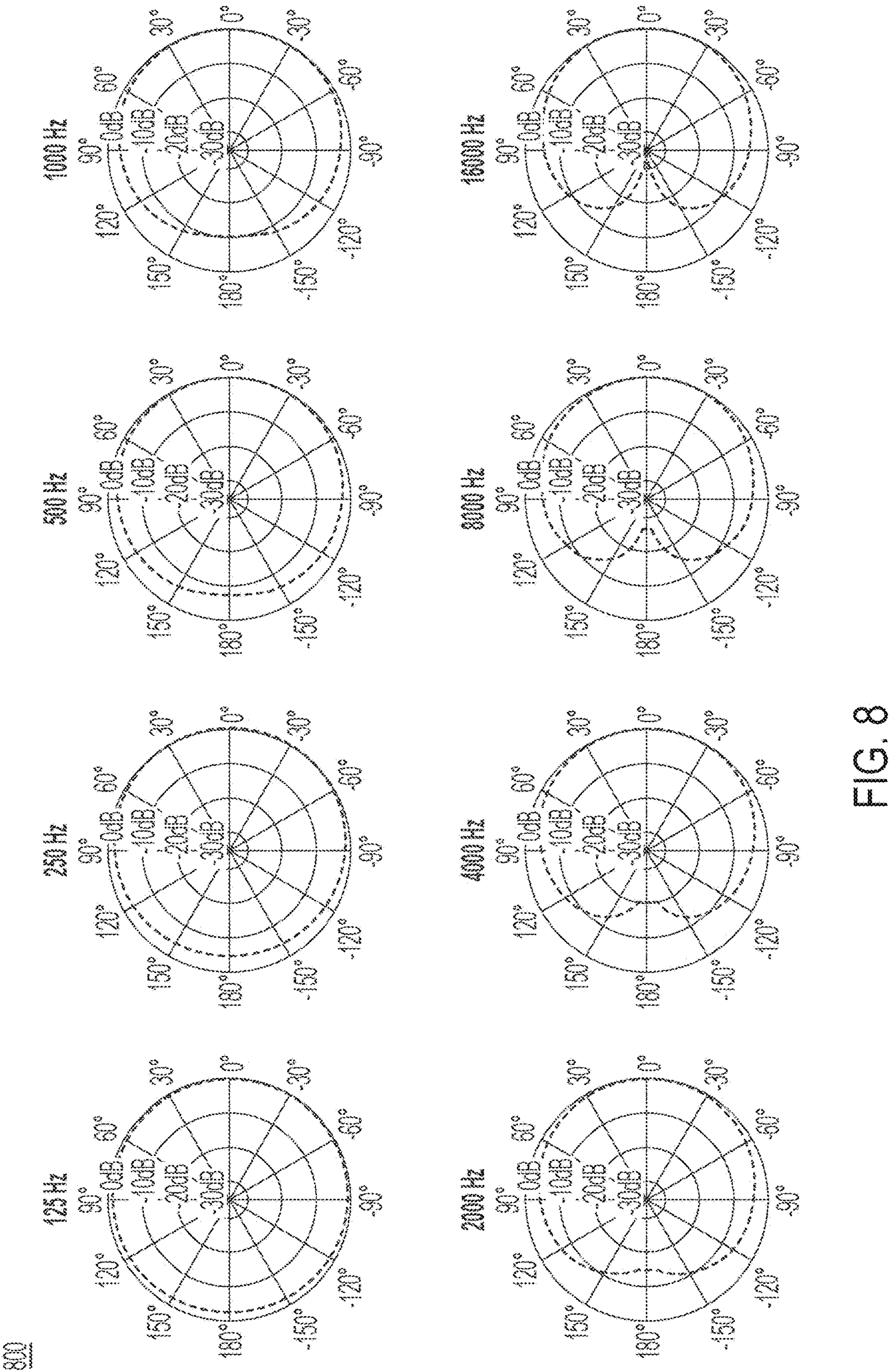
FIG. 8 illustrates example audio radiation patterns, according to one or more embodiments of the disclosure.

FIG. 8 illustrates an exemplary sound source directivity patterns 800, corresponding to different frequencies based on human speech. The audio radiation patterns can illustrate how the voice of the average speaker can travel through space based on spectral characteristics of the voice and a direction that the speaker is facing. As shown in the figure, the hypothetical speaker producing the directivity patterns 800 is facing to the right, e.g., 0°. In some embodiments, the amplitude of the directivity pattern can vary based on the frequency of the audio and a direction. For example, referring to the 8000 Hz directivity pattern, the amplitude of the directivity pattern is greatest directly in front of the speaker, e.g., 0°, the amplitude of the directivity pattern is slightly less to the side of the speaker, e.g., at 90° and −90°, while amplitude is lowest directly behind the speaker, e.g., at 180°. In some examples, the audio analysis module can analyze the speech audio data to determine an energy level, e.g., amplitude, and/or spectral distribution of the speech audio data.

Figure 9:
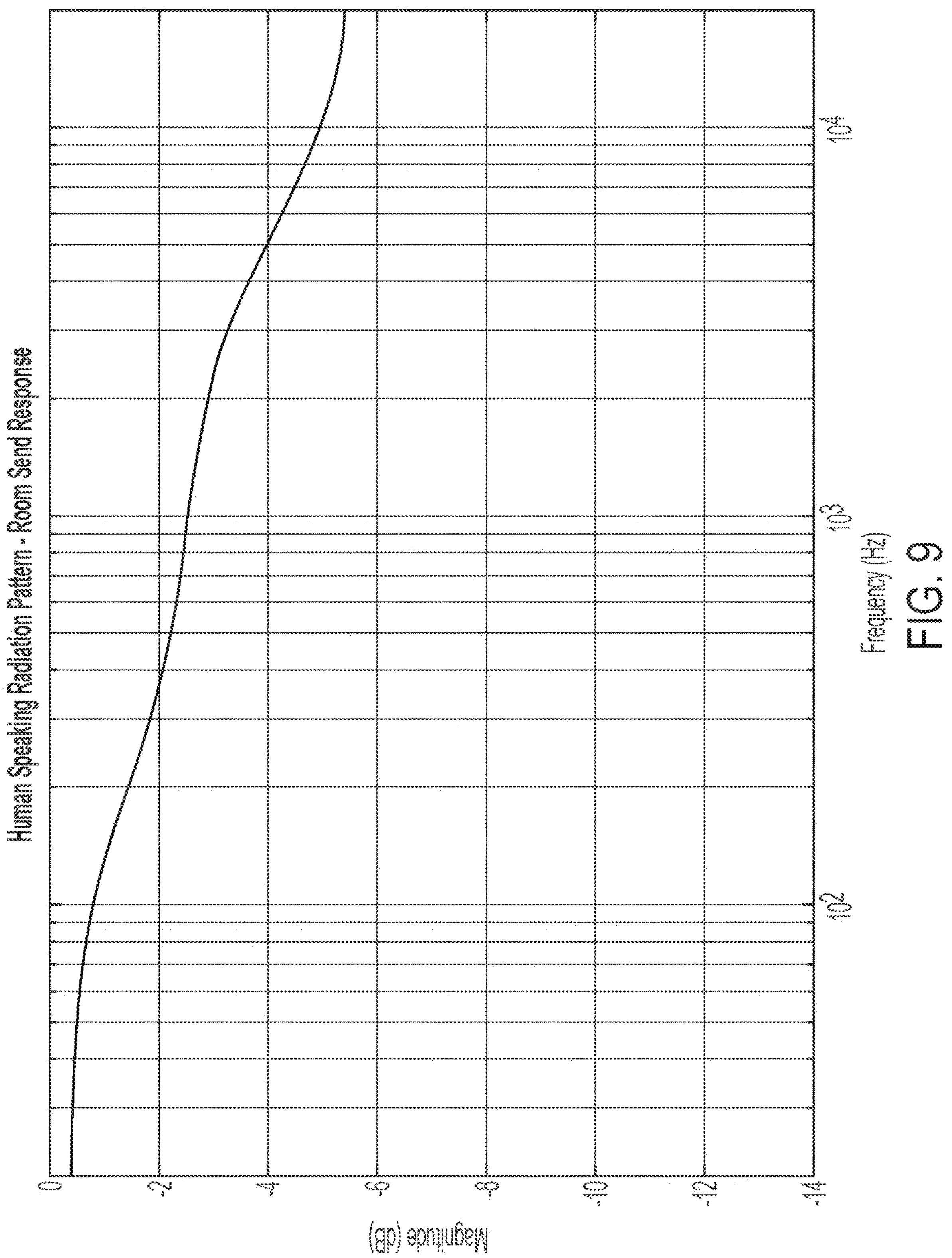
FIG. 9 illustrates example diffuse power average or diffuse-field transfer function of a sound source, according to one or more embodiments of the disclosure.

In some embodiments, a parametric gain model may be defined using frequency dependent filters. In some embodiments, in order to determine how much audio from a given sound source should be sent into a reverberation bus, a diffuse power average of the sound source may be computed (e.g., by integrating over a sphere centered about an acoustical center of the sound source). FIG. 9 illustrates an exemplary diffuse power average or diffuse-field transfer function of a sound source derived from the data in FIG. 8. The diffuse-field transfer function can be determined by integrating the sound source models 800 over all azimuth and elevation angles. In some examples, the diffuse-field transfer function can be used to derive one or more propagation parameters, e.g., reverberation parameters, to be applied to one or more real world sounds, e.g., the voice of the user. Processing the voice of the user in this manner can take into account the proper diffuser field response of the user's voice in the virtual acoustic environment.

At step 706, the mixed reality system, e.g., mixed reality system 200, can determine one or more acoustic properties associated with the virtual environment. For example, one or more features of the mixed reality environment can be identified, e.g., dimensions of the room, objects located in the room, materials corresponding to one or more boundaries and/or walls of the room and/or objects located in the room. Based on these features, one or more acoustic properties of the room, e.g., frequency dependent reverberation times spectral quality of reflections, reverberation level and frequency dependent decay times can be determined. In some embodiments, the one or more acoustic properties may be determined based on an analysis of one or more audio signals captured by a head wearable device. In some examples, the analysis can be performed at a head wearable device of the mixed real system. In some examples, the analysis can be performed on a remote head wearable device, and sent to a user. In some examples, the analysis can be performed on a remote server and sent to a user of the head wearable device.

At step 708, the mixed reality system can determine one or more signal modification parameters based on the sound source directivity pattern and the one or more acoustic properties. This step is discussed in more detail with respect to virtual environment sound processing module 1020 and room processing module 1100 described in greater detail below. In some examples, step 708 can be performed by virtual environment sound processing module 630.

Figure 10A:
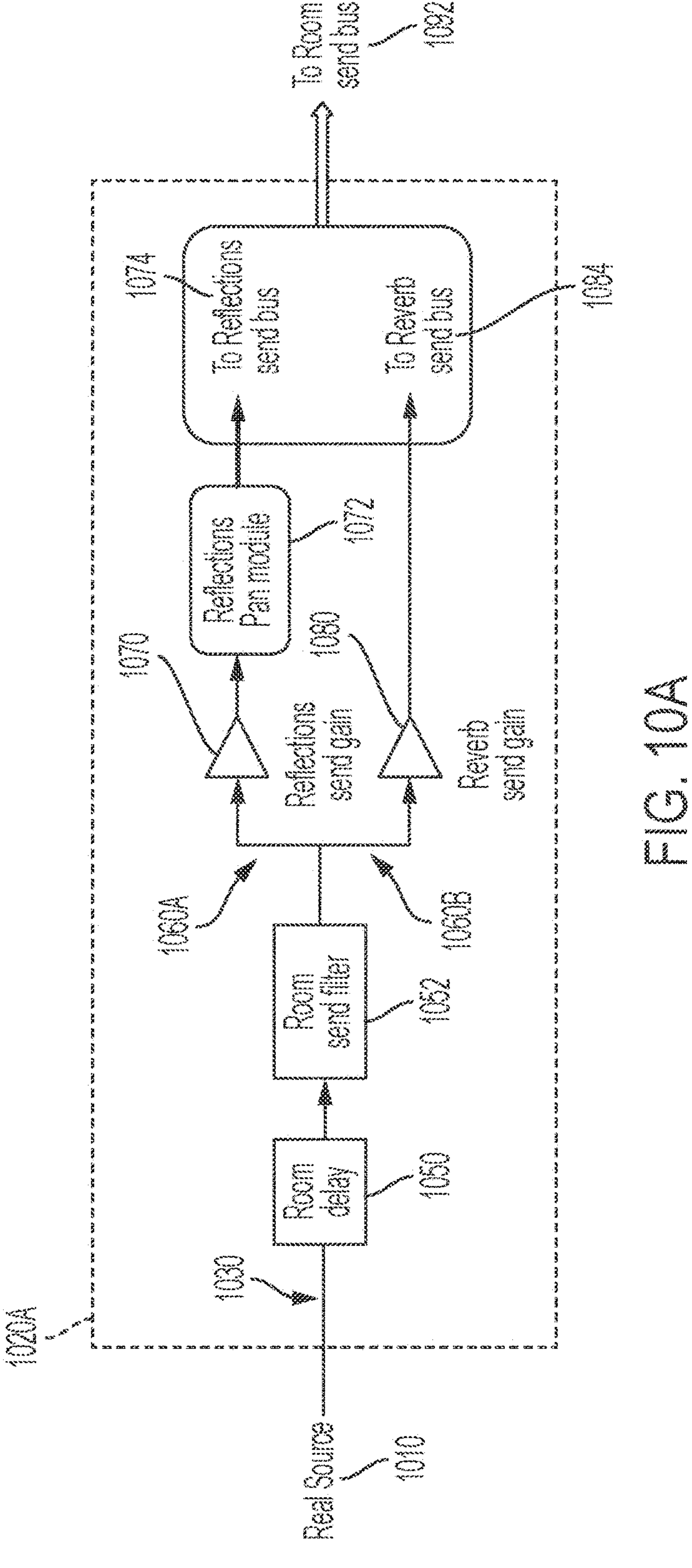
FIGS. 10A-10B illustrate example sound processing modules, according to one or more embodiments of the disclosure.
Figure 10B:
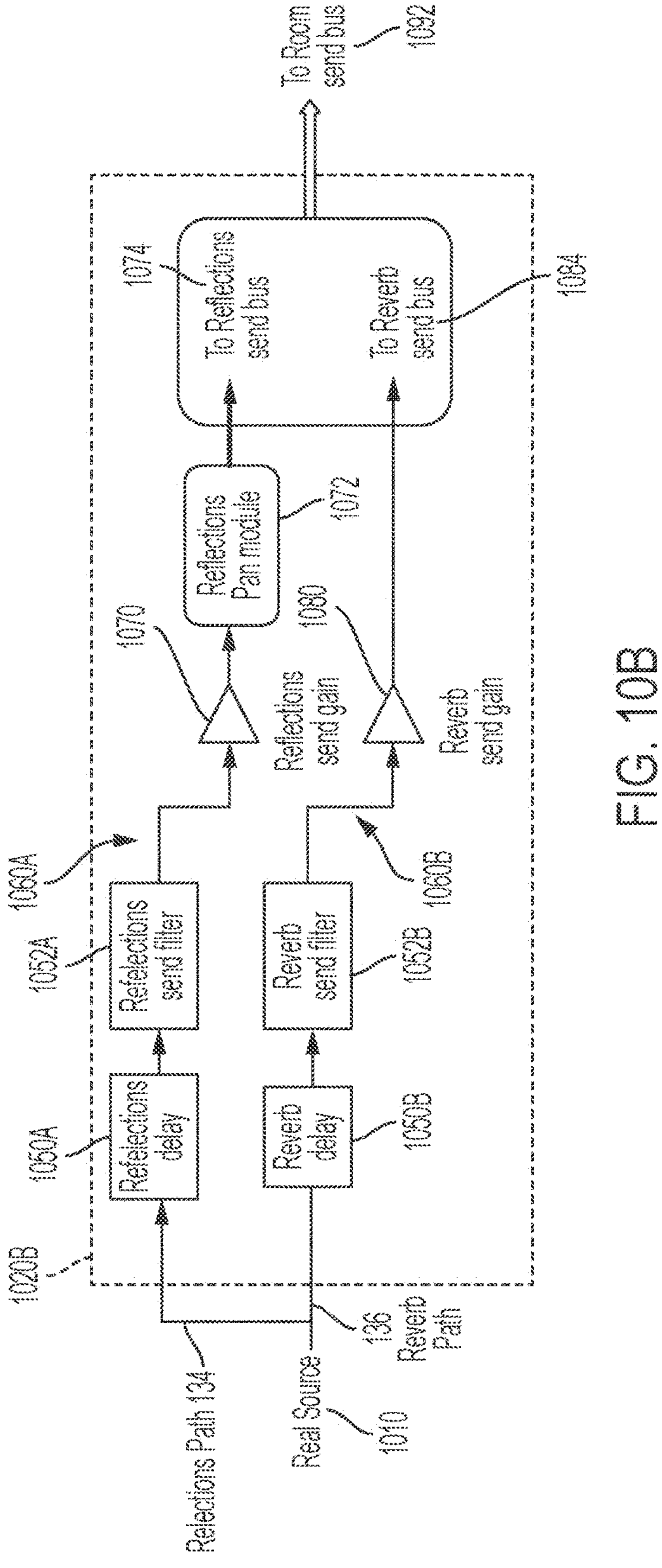
Figure 11:
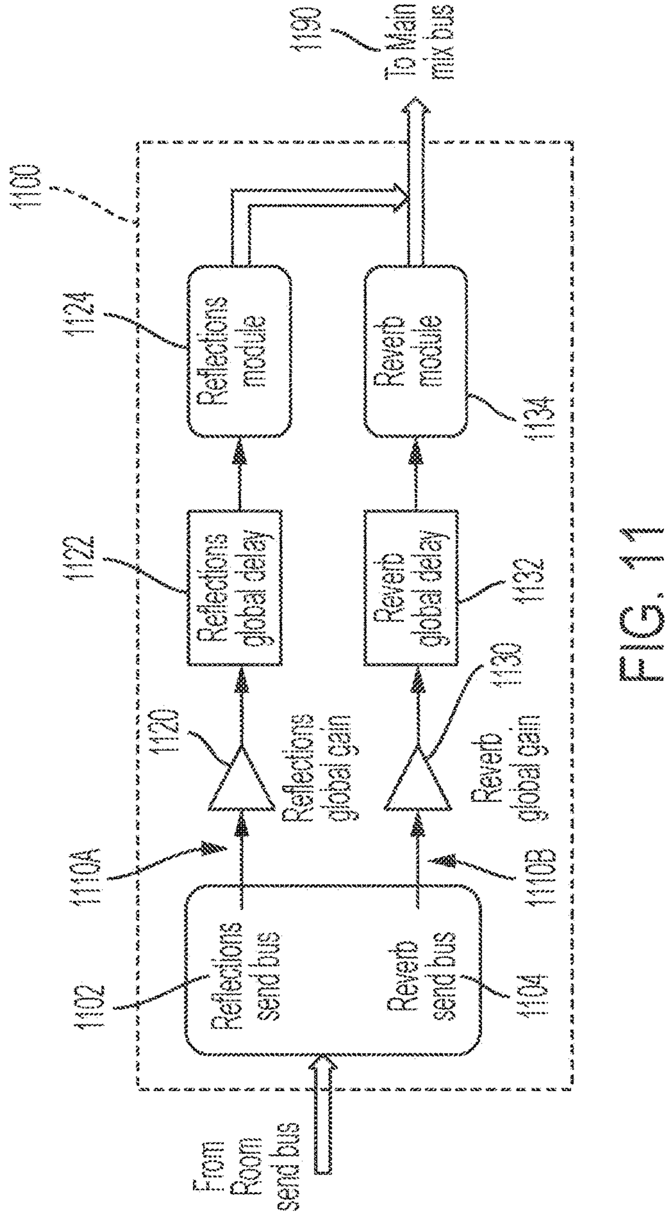
FIG. 11 illustrates an example sound processing module, according to one or more embodiments of the disclosure.

FIG. 10A illustrates a virtual environment sound processing module 1020A for a real sound source, according to some embodiments of this disclosure. FIG. 10B illustrates a virtual environment sound processing module 1020B for a real sound source, according to some embodiments of this disclosure. FIG. 11 illustrates an example room processing module 1100, according to some embodiments. In some examples, the virtual environment sound processing module 1020 and the room processing module 1100 can correspond to one or more components of the virtual environment sound processing module 630 of mixed reality environment 600C.

FIG. 10A illustrates a virtual environment sound processing module 1020A for a real sound source, according to some embodiments of this disclosure. The virtual environment sound processing module 1020A can perform processing specific to an individual real sound source 1010. In some examples, the real sound source 1010 can correspond to a voice of a user. In some embodiments, the real sound source 1010 can correspond to a voice of a person in the real environment of the user. In some embodiments, the real sound source 1010 can correspond to a sound emitted by an object in the real environment of the user.

As shown in the figure, the real environment sound processing module 1020A may include a room processing path 1030. In some embodiments with multiple real sound sources, the room processing path 1030 may be applied for each real sound source separately. Applying the filters separately may allow a more refined and accurate control over how each source is radiating sound towards a listener and into a surrounding environment. The use of filters, as opposed to broadband gains, may allow matching a desired sound radiation pattern as a function of frequency. This is beneficial because radiation properties may vary across sound source types and may be frequency dependent. An angle between a main acoustical axis of a sound source and position of a listener may affect a sound pressure level perceived by the listener. Furthermore, source radiation characteristics may affect a diffuse power average of the source.

FIG. 10B illustrates a virtual environment sound processing module 1020B for a real sound source, according to some embodiments of this disclosure. In some examples, the room processing path 1030 may correspond to separate paths for reflections and reverb, where each path includes separate delay and send filter units. For example, as shown in the figure the reflections path 1034 can include a reflections delay 1050A and a reflections send 1052A. The reverb path 1036 can include a reverb delay 1050B and a reverb send 1052B. In such examples, both paths may incorporate the radiation characterization in addition to reflections or reverb-specific considerations, including, for example but not limited to user or developer manipulation. In such examples, other components of the sound processing module 1020B can be substantially similar to those described above with respect to sound processing module 1020A, where like numbering connotes similar parts.

In some embodiments, the room processing path 1030 comprises a room delay 1050 and a room send filter 1052, followed by a reflections path (e.g., 1060A), and a reverberation path (e.g., 1060B). In some embodiments, the room delay 1050 can include voice latency. In some embodiments, the room send filter may be used to model an effect of sound source directivity on a signal going to the reflections and reverberation paths. For example, the room send filter 1052 can derive one or more filters corresponding to a diffuse power average that takes into account the directivity patterns 800 described above. The reflections path may comprise a reflections send gain 1070, and may send the signal to a reflections send bus 1074 via a reflections pan module 1072. In some examples, the reflections pan module 1072 can spatialize an audio signal based on reflections of a direct audio signal corresponding to the real source 1010. The reverberation path 1060B may comprise a reverberation send gain 1080, and may send the signal to a reverberation send bus 1084. In some examples, the reverberation send gain 1080 can apply the filters corresponding to the diffuse power average described above in FIG. 9. The reflections send bus 1074 and the reverberations send bus 1084 may be grouped into a room send bus 1092, which can be configured to feed a room processing module as described below with respect to FIG. 11.

FIG. 11 illustrates an example room processing module 1100, according to some embodiments. In some embodiments, the mixed reality environment may include more than one room processing module—for instance, when the mixed reality environment includes more than one room, such that each room includes a corresponding room processing module. As shown in the figure, the room processing module 1100 may comprise a reflections processing path 1110A, and/or a reverberation processing path 1110B.

At step 710 the mixed reality system can apply the signal modification parameter to obtain a second audio signal. In some examples, the signal modification parameters can be applied by via one or more of the reverberation processing path 1110B and/or the reflections processing path 1110A. The reflections processing path 1110A may receive a signal from a reflections send bus 1102 (which may correspond to reflections send bus 1074 described above), and output a signal into the main mix bus 1190 (which may correspond to main mix bus 628 described above). In some examples, the reflections processing path 1110A may comprise a reflections global gain 1120, a reflections global delay 1122, and/or a reflections module 1124, which may simulate/render reflections. The reverberation processing path 1110B may receive a signal from a reverberation send bus 1104 (which may correspond to reverberation send bus 1084 described above), and output a signal into the main mix bus 1190. The reverberation processing path 1110B may include a reverberation global gain 1130, a reverberation global delay 1132, and/or a reverberation module 1134. In some examples the delay times, e.g., the reflections global delay, may be set to zero (no delay), e.g., when delay is applied during per-source processing as shown in FIG. 10.

In one or more examples, sound that has been mixed by the main mix bus 1190 can be output to a user, e.g., user 510. Thus, the second audio signal can correspond to a real sound source that includes the acoustic signature of the mixed reality environment. In some examples, the second audio signal can correspond to sound that has been mixed by the main mix bus 628, 1190. In some examples, the second signal can include contributions of one or more sound sources (virtual and/or real), as discussed above, with respect to system 600D.

At step 712, the mixed reality system can present the second audio signal to the user. In one or more examples, the second audio signal can be converted to left and right analog signals (e.g., by DSP audio spatializer 422 of FIG. 4) that are amplified and presented to left and right speakers 412 and 414, respectively. Where left and right speakers 412 and 414 are configured to acoustically couple to left and right ears, respectively, of a user, e.g., user 510.

Accordingly, embodiments of the present disclosure can provide systems and methods to apply artificial acoustic propagation effects, e.g., reverberation effects, corresponding to an XR environment to one or more sounds originating from the real world environment. For example, referring to the example illustrated in mixed reality environment 560, a user 510 may be using a first mixed reality system 512 that is in communication with the mixed reality environment and remote user 550 may be using a second mixed reality system 552 that is also in communication with the mixed reality environment. According to one or more embodiments of this disclosure, an audio input signal corresponding to the voice of user 510 can be received by one or more sensors located on the first mixed reality system 512. For example, a microphone of the mixed reality system 512 can capture the voice of the user 510.

In one or more examples, sound source directivity patterns can be determined based on the sound source. For example, the sound source directivity patterns 800 can be determined because the sound source corresponds to the user's voice. In some examples, where the sound source does not correspond to a human voice, a different directivity pattern can be determined. In some examples, one or more acoustic properties associated with the mixed reality environment can be determined. For example, acoustic properties, e.g., frequency dependent reverberation times, can be determined based on one or more features of mixed reality environment 560, e.g., dimensions of the mixed reality environment, the type of material comprising the walls and/or the floor, and/or the location and type of materials comprising one or more virtual reality objects, e.g., 522B, 524B, 526B, 554.

In one or more examples, a signal modification parameter can be determined based on at least one of the sound source directivity patterns and/or the acoustic properties of the mixed reality environment. In some examples, the signal modification parameter can correspond to one or more reverberation properties of the virtual environment, e.g., corresponding to virtual reverberation model 634 and/or reverberation send gain 1080 path. In some examples, the signal modification parameter can correspond to one or more reflection properties of the virtual environment, e.g., corresponding to virtual reflection model 636 and/or reflection send gain 1070 path. In one or more examples, the signal modification parameter can be applied to the input audio signal to obtain a second audio signal, where the second audio signal includes reverberation and/or reflection contributions corresponding to the mixed reality environment 560.

In one or more examples, the second audio signal can be presented to the user 510. In this manner, the acoustic properties of the voice of the user 510 can match the acoustic properties of the voice of the remote user 550 because both voices as perceived by user 510 can include acoustic properties of both the real environment and the virtual environment. This can improve the immersive experience of the user 510 by convincing the user 510 that they are in the same acoustical space as the remote participants. In some embodiments, other propagation effects, e.g., occlusion, and/or diffraction, can be applied to sounds originating in the real environment in order to heighten the realism of the virtual objects' acoustic presence.

Figures 12A, 12B:
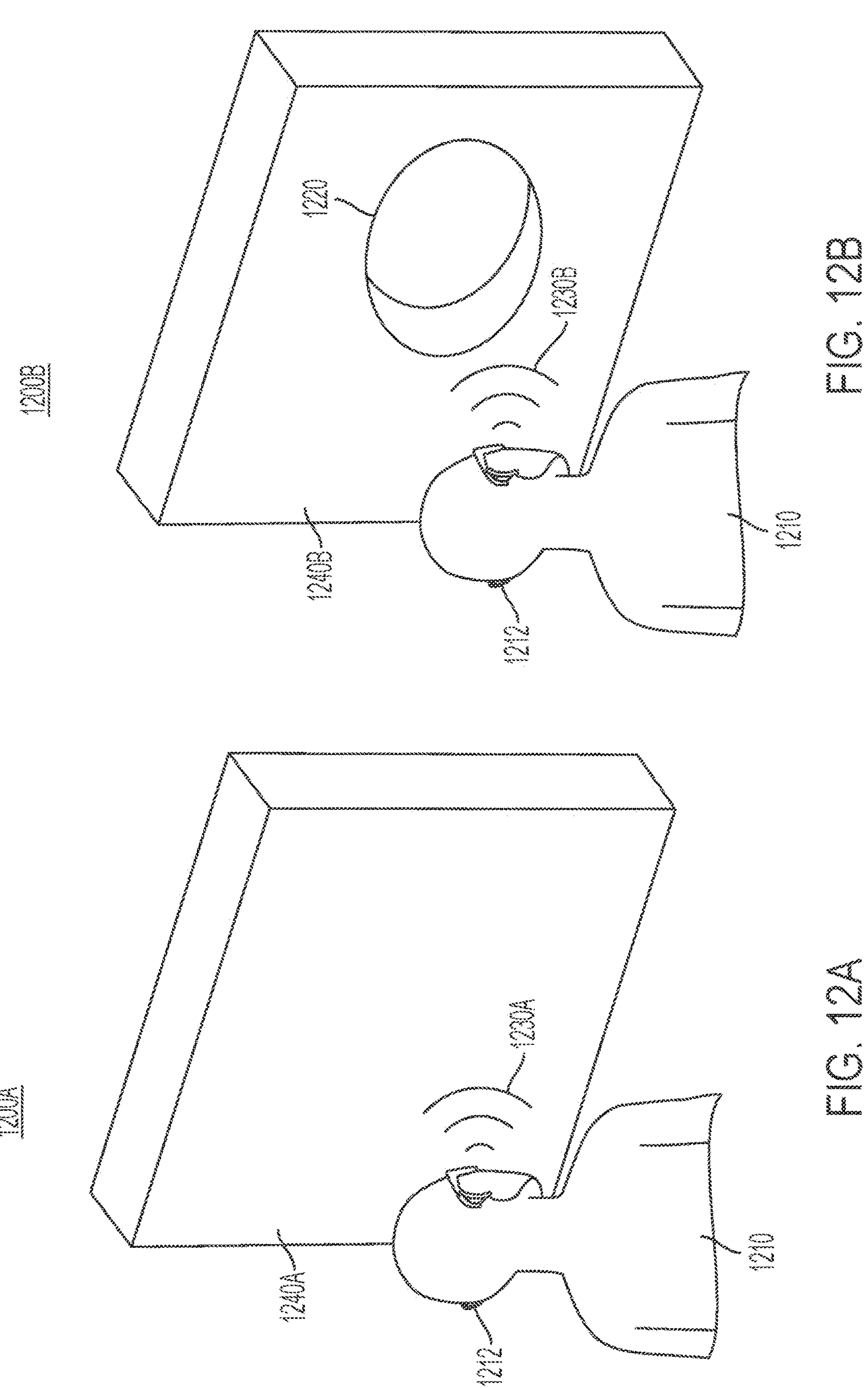
FIGS. 12A-12B illustrates an example mixed reality environment, according to one or more embodiments of the disclosure.

FIGS. 12A and 12B illustrate an environment where systems and methods according to embodiments of this disclosure can be used. For example, FIG. 12A can correspond to a real environment 1200A, according to embodiments of this disclosure. As shown in the figure, user 1210 may be using a mixed reality system 1212 that is in communication with a mixed reality environment, e.g., mixed reality environment 1200B. In one or more examples, the user 1210 can be speaking while facing a wall 1240A of the real environment 1200A. FIG. 12B can correspond to a mixed reality environment 1200B, according to embodiments of this disclosure. The user 1210 can be using a mixed reality system 1212 that is in communication with the mixed reality environment mixed reality environment 1200B. As shown in the figure, the user 1210 can be speaking while facing a wall 1240B of the mixed reality environment 1200B. As shown in the figure, the wall 1240B can include a large hole, e.g., portal, 1220. As the user speaks while facing the wall 1240B, the user may expect to hear particular acoustic properties associated with the portal 1220. However, because the user is facing a wall 1240A without a portal in the real environment 1200A, acoustic properties associated with the portal may be absent from the sound 1230 corresponding to the user's voice as perceived by the user in the real environment 1200A. Embodiments according to examples of this disclosure can bridge this gap between the user's expectations and the user's experience by determining and applying one or more acoustic properties associated with the mixed reality environment to the user's voice 1230.

In one or more examples, an audio input signal 1230 corresponding to the voice of user 1210 can be received by one or more sensors located on the first mixed reality system 1212. For example, a microphone of the mixed reality system 1212 can capture the voice of the user 1210. In one or more examples, sound directivity patterns can be determined based on the sound source, e.g., the voice 1230 of the user 1210. For example, the source directivity patterns 800 can be determined because the sound source corresponds to the user's voice 1230. In some examples, where the sound source does not correspond to a human voice, a different directivity pattern can be determined.

In one or more examples, one or more acoustic properties associated with the mixed reality environment can be determined. For example, acoustic properties, e.g., frequency dependent reverberation times, can be determined based on one or more features of mixed reality environment 560, e.g., dimensions of the mixed reality environment, the type of material comprising the walls and/or the floor, and/or the location and type of materials comprising one or more virtual reality objects, e.g., 1220.

In one or more examples, a signal modification parameter can be determined based on at least one of the sound source directivity pattern and the acoustic properties of the mixed reality environment. In some examples, the signal modification parameter can correspond to one or more reverberation properties of the virtual environment, e.g., corresponding to virtual reverberation model 634 and/or reverberation send gain 1080 path. In some examples, the signal modification parameter can correspond to one or more reflection properties of the virtual environment, e.g., corresponding to virtual reflection model 636 and/or reflection send gain 1070 path. In one or more examples, the signal modification parameter can be applied to the input audio signal to obtain a second audio signal, where the second audio signal includes reverberation and/or reflection contributions corresponding to the mixed reality environment 1200B.

In one or more examples, the second audio signal can be presented to the user 1210. In this manner, the acoustic properties of the voice 1230 as perceived by the user via the mixed reality system 1212 can match the acoustic properties of the mixed reality environment 1200B. This can improve the immersive experience of the user 1210 by convincing the user 1210 that they are in the same acoustical space shown via the mixed reality system 1212. In some embodiments, other propagation effects, e.g., occlusion, and/or diffraction, can be applied to sounds originating in the real environment in order to heighten the realism of the virtual objects' acoustic presence.

To the extent that the embodiments and examples provided above correspond to a mixed reality system, a skilled artisan would understand that the same approach could be applied to a virtual reality system. For example, a user of the XR or virtual reality system may be using earbuds or headphones rather than the built-in speakers of the device. In some examples, the virtual reality system includes a speaker and/or headphone device that blocks the ear canal of the user, systems and methods according to the present disclosure can be used. In such examples, the sounds from the real world may not be audible to the user. In order for the user to appear in the MRE, the real world reflections and reverberation may similarly be presented in the output mix rendered out to the earbuds or headphones. For instance, in such examples, in addition to the user perceiving real sounds, e.g., the user's voice, with acoustic properties corresponding to the real environment and not the virtual environment, the user's own voice may sound unnatural. For example, the user's voice may sound occluded, e.g., due to a combination of bone conduction and acoustic transmission from the vocal cords of the users.

Accordingly, the user perceiving real sounds with acoustic properties corresponding to the real environment and not the virtual environment can be addressed as discussed above. For example, a portion of the dry captured signal, e.g., signal captured by one or more microphones of the XR system, can be presented to the user via the earbuds or headphones. In some embodiments, the mode of operation, which may specify parameters such as mixing levels or other conditional properties, may be variable based on whether external earbuds or headphones are determined to be in use.

Regarding the user's voice sounding unnatural due to their ear canal being occluded, systems and methods according to embodiments of this disclosure can process the user's voice such that it sounds natural, e.g., as if the ear canal was open. For example, an audio input signal corresponding to the user's voice can be equalized so that the audio signal provided to the user sounds natural when heard in combination with the occluded acoustic signal corresponding to the user's voice. For example, presenting the captured unfiltered user's voice may sound unnatural, just as hearing one's recorded voice sounds unnatural because an individual typically hears their voice as conducted through their head. By filtering the captured user's voice to imitate how the voice may sound to the user's unoccluded ear canal, this unnatural effect can be mitigated. Accordingly, embodiments of the present disclosure can provide an audio experience where the physical acoustic limitations of the headphones blocking the ear canal appear to be overcome. In such examples, obtaining a dry signal corresponding to the user's voice may be improve latency associated with performing signal processing to obtain the equalized signal to present to the user.

Embodiments of the present disclosure provide systems and methods for rendering audio for a mixed reality environment. Methods according to embodiments of this disclosure include receiving an input audio signal, via a wearable device in communication with a mixed reality environment, the input audio signal corresponding to a sound source originating from a real environment. In some embodiments, the system can determine one or more acoustic properties associated with the mixed reality environment. In some embodiments, the system can determine a signal modification parameter based on the one or more acoustic properties associated with the mixed reality environment. In some embodiments, the system can apply the signal modification parameter to the input audio signal to determine a second audio signal. In some embodiments, the system can present the second audio signal to the user.

In one or more embodiments, the input audio signal can correspond to a voice of the user. In one or more embodiments, the mixed reality environment can correspond to a remote meeting environment. In one or more embodiments, the signal modification parameter can correspond to one or more reflections of the input audio signal off a surface of the mixed reality environment. In one or more embodiments, the signal modification parameter corresponds to one or more reverberations of the input audio signal off a surface of the mixed reality environment. In one or more embodiments, the method can further include determining a source directivity pattern based on the input audio signal. In such embodiments, determining the signal modification parameter can be further based on the source directivity pattern.

In one or more embodiments, the method can further include: receiving a third input audio signal, via a wearable device in communication with a mixed reality environment, the input audio signal corresponding to a sound source originating from a real environment, determining a second signal modification parameter based on the one or more acoustic properties associated with the mixed reality environment, applying the signal modification parameter to the input audio signal to determine a fourth audio signal, mixing the second audio signal and the fourth audio signal, and presenting the mixed audio signal to the user. In one or more embodiments, the method can further include processing the first audio signal to isolate a sound corresponding to the sound source.

A wearable device according to embodiments of the present disclosure can include a display configured to display a view of a virtual environment, one or more sensors, one or more speakers, and one or more processors. In some embodiments, the one or more processors can be configured to perform a method including: receiving an input audio signal, via a wearable device in communication with a mixed reality environment, the input audio signal corresponding to a sound source originating from a real environment, determining one or more acoustic properties associated with the mixed reality environment, determining a signal modification parameter based on the one or more acoustic properties associated with the mixed reality environment, applying the signal modification parameter to the input audio signal to determine a second audio signal, and presenting the second audio signal to the user.

In one or more embodiments, the input audio signal can correspond to a voice of the user. In one or more embodiments, the mixed reality environment can correspond to a remote meeting environment. In one or more embodiments, the signal modification parameter can correspond to one or more reflections of the input audio signal off a surface of the mixed reality environment. In one or more embodiments, the signal modification parameter corresponds to one or more reverberations of the input audio signal off a surface of the mixed reality environment. In one or more embodiments, the method can further include determining a source directivity pattern based on the input audio signal. In such embodiments, determining the signal modification parameter can be further based on the source directivity pattern.

In one or more embodiments, the method can further include: receiving a third input audio signal, via a wearable device in communication with a mixed reality environment, the input audio signal corresponding to a sound source originating from a real environment, determining a second signal modification parameter based on the one or more acoustic properties associated with the mixed reality environment, applying the signal modification parameter to the input audio signal to determine a fourth audio signal, mixing the second audio signal and the fourth audio signal, and presenting the mixed audio signal to the user. In one or more embodiments, the method can further include processing the first audio signal to isolate a sound corresponding to the sound source.

Although the disclosed examples have been fully described with reference to the accompanying drawings, it is to be noted that various changes and modifications will become apparent to those skilled in the art. For example, elements and/or components illustrated in the drawings may be not be to scale and/or may be emphasized for explanatory purposes. As another example, elements of one or more implementations may be combined, deleted, modified, or supplemented to form further implementations. Other combinations and modifications are to be understood as being included within the scope of the disclosed examples as defined by the appended claims.

The invention claimed is:

1. A method for providing audio output through a wearable device configured to present a mixed reality environment, the method comprising:

receiving an input audio signal corresponding to a sound source originating from a real environment;

determining one or more acoustic properties of the mixed reality environment, wherein the one or more acoustic properties of the mixed reality environment are different from at least one acoustic property of the real environment;

determining a signal modification parameter based on the one or more acoustic properties of the mixed reality environment;

applying the signal modification parameter to the input audio signal to determine a second audio signal; and presenting the second audio signal through the wearable device.

2. The method of claim 1, wherein the input audio signal corresponds to the sound source that is a voice of a user of the wearable device.

3. The method of claim 1, wherein the mixed reality environment corresponds to a remote meeting environment.

4. The method of claim 1, wherein the signal modification parameter corresponds to one or more reflections of the input audio signal off a surface of the mixed reality environment.

5. The method of claim 1, wherein the signal modification parameter corresponds to one or more reverberations of the input audio signal off a surface of the mixed reality environment.

6. The method of claim 1, further comprising determining a source directivity pattern based on the input audio signal.

7. The method of claim 6, wherein the determining the signal modification parameter is further based on the source directivity pattern.

8. The method of claim 1, further comprising:

receiving a third input audio signal corresponding to a second sound source originating from the real environment;

determining a second signal modification parameter based on the one or more acoustic properties of the mixed reality environment;

applying the second signal modification parameter to the third input audio signal to determine a fourth audio signal;

mixing the second audio signal and the fourth audio signal; and presenting the mixed audio signal through the wearable device.

9. The method of claim 1, further comprising processing the first audio signal to isolate a sound corresponding to the sound source.

10. A wearable device configured to present a mixed reality environment, the wearable device comprising:

a display configured to display a view of the mixed reality environment;

one or more sensors;

one or more speakers; and one or more processors configured to perform operations comprising:

receiving an input audio signal, via the one or more sensors, the input audio signal corresponding to a sound source originating from a real environment;

determining one or more acoustic properties of the mixed reality environment, wherein the one or more acoustic properties of the mixed reality environment are different from at least one acoustic property of the real environment;

determining a signal modification parameter based on the one or more acoustic properties of the mixed reality environment;

applying the signal modification parameter to the input audio signal to determine a second audio signal; and presenting the second audio signal through the one or more speakers.

11. The wearable device of claim 10, wherein the input audio signal corresponds to the sound source that is a voice of a user of the wearable device.

12. The wearable device of claim 10, wherein the mixed reality environment corresponds to a remote meeting environment.

13. The wearable device of claim 10, wherein the signal modification parameter corresponds to one or more reflections of the input audio signal off a surface of the mixed reality environment.

14. The wearable device of claim 10, wherein the signal modification parameter corresponds to one or more reverberations of the input audio signal off a surface of the mixed reality environment.

15. The wearable device of claim 10, wherein the method further comprises determining a source directivity pattern based on the input audio signal.

16. The wearable device of claim 15, wherein the determining the signal modification parameter is further based on the source directivity pattern.

17. The wearable device of claim 10, wherein the method further comprises:

receiving a third input audio signal, via the one or more sensors, the third input audio signal corresponding to a second sound source originating from the real environment;

determining a second signal modification parameter based on the one or more acoustic properties of the mixed reality environment;

applying the second signal modification parameter to the third input audio signal to determine a fourth audio signal;

mixing the second audio signal and the fourth audio signal; and presenting the mixed audio signal through the one or more speakers.

18. The wearable device of claim 10, wherein the method further comprises processing the first audio signal to isolate a sound corresponding to the sound source.

* * * * *